United States Patent [19]

McKay et al.

[11] Patent Number: 5,977,271
[45] Date of Patent: Nov. 2, 1999

[54] PROCESS FOR PREPARING THERMOSET INTERPOLYMERS AND FOAMS

[75] Inventors: Kevin W. McKay, White Bear Lake, Minn.; Francis J. Timmers, Midland, Mich.; Edwin R. Feig, Baton Rouge, La.; Thoi H. Ho; Seema V. Karande, both of Lake Jackson, Tex.

[73] Assignee: The Dow Chemical Company, Midland, Mich.

[21] Appl. No.: 08/921,642

[22] Filed: Aug. 27, 1997

Related U.S. Application Data

[60] Continuation-in-part of application No. 08/761,049, Dec. 5, 1996, abandoned, which is a division of application No. 08/300,300, Sep. 2, 1994, abandoned.

[51] Int. Cl.⁶ .............................. C08F 8/34; C08F 236/20
[52] U.S. Cl. ..................... 526/170; 526/160; 525/57; 525/95; 525/97; 525/105; 525/106; 525/193; 525/194; 525/195; 525/210; 525/211; 525/216; 525/241; 525/343; 525/351; 525/352; 525/374; 525/375; 525/376; 525/384; 525/387; 522/158; 522/160
[58] Field of Search ................... 525/194, 333.3, 525/333.6, 342, 195, 384, 193, 387, 210, 211, 95, 97, 214, 216, 333.5, 57, 105, 106, 333.8, 241, 332.1, 343, 351, 352, 333.7, 374, 375, 376, 332.5, 332.6, 332.7, 333.9; 526/170, 160; 522/160, 158

[56] References Cited

U.S. PATENT DOCUMENTS

| | | |
|---|---|---|
| 3,758,643 | 9/1973 | Fischer . |
| 4,130,535 | 12/1978 | Coran et al. . |
| 4,311,628 | 1/1982 | Abdou-Sabet et al. . |
| 4,477,631 | 10/1984 | Danesi et al. . |
| 4,835,204 | 5/1989 | Carfagnini . |
| 5,288,791 | 2/1994 | Collier, IV et al. . |
| 5,414,040 | 5/1995 | McKay et al. ...................... 524/576 X |

FOREIGN PATENT DOCUMENTS

| | | |
|---|---|---|
| 0 416 815 A2 | 3/1991 | European Pat. Off. . |
| 0 572 990 | 12/1993 | European Pat. Off. . |
| 0 572 990 A2 | 12/1993 | European Pat. Off. . |
| 0 634 427 A1 | 1/1995 | European Pat. Off. . |
| WO 94/00500 | 1/1994 | WIPO . |
| 94/06858 A1 | 3/1994 | WIPO . |
| 96/07681 | 3/1996 | WIPO . |

OTHER PUBLICATIONS

Nachr. Chem. Tech. Lab. 41 (Dec. 1993) Nr. 12, "Neue Generationen von Polyolefinmaterialien", p. 1341–51.

Lu, Zejian et al., *Journal of Polymer Science*, vol. 53, "Copolymerization of Ethylene and Styrene with Supported $TiCl_4/NdCl_3$ Catalyst", pp. 1453–1460, (1994).

Coran, A. Y., Rubber Chemicals Research Laboratory, "Thermoplastic Elastomers Based on Elastomer–Thermoplastic Blends Dynamically Vulcanized", pp. 135–160.

Dialog Information Services, file 351, Derwent WPI, Dialog accession no. 009854777, WPI accession no. 93/278323/35, Idemitsu Kosan Co Ltd: "Olefinic copolymer for elastomers, high tenacity material and complex materials—prepd. by copolymerising styrenic monomer and olefin in catalyst contg. tranisition metal and organo metallic cpds., for modified copolymers mfr." & JP A 5194666, Aug. 03, 1993, 9335 (Basic abstract).

International Search Report dated Dec. 21, 1995 issued by the EPO acting as the International Searching Authority in PCT/US95/09945.

*Primary Examiner*—Fred Teskin

[57] ABSTRACT

The subject invention provides a thermoset elastomer comprising a crosslinked pseudorandom or substantially random interpolymer of: (a) from 15 to 70 weight percent of at least one α-olefin, (b) from 30 to 70 weight percent of at least one vinylidene aromatic compound, and (c) from 0 to 15 weight percent of at least one diene. The subject invention further provides a thermoplastic vulcanizate comprising the thermoset elastomers of the invention as provided in a thermoplastic polyolefin matrix. The subject invention further provides processes for preparing the inventive thermoset elastomers and thermoplastic vulcanizates, as well as parts fabricated therefrom. The inventive materials have a superior balance of properties, as compared to EPM and EPDM based materials. The subject invention also pertains to foams and methods for their preparation.

23 Claims, No Drawings

PROCESS FOR PREPARING THERMOSET INTERPOLYMERS AND FOAMS

CROSS-REFERENCE TO RELATED APPLICATIONS

This application is a continuation-in-part of application Ser. No. 08/761,049 (Atty. Docket no. C-40,874-B) filed Dec. 5, 1996, (now abandoned) which is a divisional of application Ser. No. 08/300,300 (Atty. Docket no. C-40,874) filed Sep. 2, 1994 (now abandoned).

STATEMENT REGARDING FEDERALLY SPONSORED RESEARCH OR DEVELOPMENT

"Not Applicable"

BACKGROUND OF THE INVENTION

The subject invention pertains to thermoset interpolymers, to a process for their preparation, and to products fabricated from such thermoset interpolymers.

In one preferred embodiment, the present invention further pertains to foams prepared from such thermoset interpolymers and to methods for the preparation of cross-linked α-olefin/vinylidene aromatic monomer or hindered aliphatic vinylidene monomer interpolymers.

Elastomers are defined as materials which experience large reversible deformations under relatively low stress. Elastomers are typically characterized as having structural irregularities, non-polar structures, or flexible units in the polymer chain. Some examples of commercially available elastomers include natural rubber, ethylene/propylene (EPM) copolymers, ethylene/propylene/diene (EPDM) copolymers, styrene/butadiene copolymers, chlorinated polyethylene, and silicone rubber.

Thermoplastic elastomers are elastomers having thermoplastic properties. That is, thermoplastic elastomers may be molded or otherwise shaped and reprocessed at temperatures above their melting or softening point. One example of thermoplastic elastomers is styrene-butadiene-styrene (SBS) block copolymers. SBS block copolymers exhibit a two phase morphology consisting of glassy polystyrene domains connected by rubbery butadiene segments. At temperatures between the glass transition temperatures of the butadiene midblock and the styrene endblocks, that is, at temperatures from −90° C. to 116° C., the SBS copolymers act like a crosslinked elastomer.

European Patent Publication 416,815 discloses pseudorandom ethylene-styrene interpolymers. Uncrosslinked pseudorandom ethylene/styrene interpolymers exhibit a decreased modulus at temperatures above the melting or softening point of the interpolymer.

SBS copolymers and uncrosslinked ethylene-styrene pseudorandom interpolymers suffer the disadvantages of relatively low mechanical strength, susceptibility to ozone degradation (to the extent that they have sites of unsaturation in the polymer backbone), and utility in only applications where the temperature of the elastomer will not exceed the melting or softening point of the elastomer.

In contrast, thermoset elastomers are elastomers having thermoset properties. That is, thermoset elastomers irreversibly solidify or "set" when heated, generally due to an irreversible crosslinking reaction. Two examples of thermoset elastomers are crosslinked ethylene-propylene monomer rubber (EPM) and crosslinked ethylene-propylene-diene monomer rubber (EPDM). EPM materials are made by the copolymerization of ethylene and propylene. EPM materials are typically cured with peroxides to give rise to crosslinking, and thereby induce thermoset properties. EPDM materials are linear interpolymers of ethylene, propylene, and a nonconjugated diene such as 1,4-hexadiene, dicyclopentadiene, or ethylidene norbornene. EPDM materials are typically vulcanized with sulfur to induce thermoset properties, although they alternatively may be cured with peroxides. While EPM and EPDM materials are advantageous in that they have applicability in higher temperature applications, EPM and EPDM elastomers suffer the disadvantages of low green strength (at lower ethylene contents), of a higher susceptibility of the cured elastomer to attack by oils than characteristic of styrene butadiene rubbers, and of resistance of the cured elastomer to surface modification.

Elastomers suitable for use over a broad range of temperatures and which are also less susceptible to ozone degradation are desired. Thermoset elastomers which are prepared from elastomers having high green strength (which provides greater flexibility in their handling prior to curing) are particularly desired. Also desired, are thermoset elastomers which are resistant to oil, which are useful in fabricated parts which typically contact oil, such as automotive parts and gaskets. Also desired are thermoset elastomers which easily undergo surface modification, to promote surface adhesion of the elastomer and/or to provide ionic sites on the elastomer surface. Also desired is a process for preparing such thermoset elastomers.

Thermoplastic vulcanizates are crystalline polyolefinic matrices through which thermoset elastomers are generally uniformly distributed. Examples of thermoplastic vulcanizates include EPM and EPDM thermoset materials distributed in a crystalline polypropylene matrix. Such thermoplastic vulcanizates are disadvantageous, in that they are susceptible to oil degradation. Thermoplastic vulcanizates which are more resistant to oil are desired. Also desired is a process for preparing such thermoplastic vulcanizates.

Interpolymers prepared from α-olefin/vinylidene aromatic monomer or hindered aliphatic vinylidene monomer have excellent properties; however, it would be desirable to have such polymers with improved properties.

It has been discovered that properties such as higher upper service temperature, improved melt processibility and self sticking tendencies of such interpolymers can be improved via crosslinking of the interpolymers.

The foams prepared from the cross-linked interpolymers are believed to have one or more of the following improvements: improved upper service temperature, lower density, improved elastic recovery properties, improved mechanical properties as compared to non-crosslinked interpolymer foams.

SUMMARY OF INVENTION

The subject invention provides a thermoset elastomer comprising a crosslinked substantially random interpolymer of: (a) from 15 to 70 weight percent of polymer units derived from at least one α-olefin, (b) from 30 to 70 weight percent of polymer units derived from at least one vinylidene aromatic compound, and (c) from 0 to 15 weight percent of polymer units derived from at least one diene.

The subject invention further provides a process for making a thermoset elastomer comprising:

(a) reacting at least one α-olefin with at least one vinylidene aromatic compound in the presence of a constrained geometry catalyst to form a substantially random interpolymer; and (b) curing the substantially random interpolymer to form a thermoset elastomer.

The subject invention further provides a thermoplastic vulcanizate comprising a blend of:
(1) a crosslinked substantially random interpolymer of
  (a) from 15 to 70 weight percent of at least one α-olefin,
  (b) from 30 to 70 weight percent of at least one vinylidene aromatic compound, and
  (c) from 0 to 15 weight percent of at least one diene; and
(2) at least one thermoplastic polyolefin.

The subject invention further provides a process for making a thermoplastic vulcanizate comprising:
  (a) reacting at least one α-olefin with at least one vinylidene aromatic compound and optionally at least one diene in the presence of a constrained geometry catalyst to form a substantially random interpolymer;
  (b) intimately mixing the substantially random interpolymer with at least one thermoplastic polyolefin at a temperature above the melting or softening point of the thermoplastic polyolefin;
  (c) providing to the intimate mixture an agent for curing the substantially random interpolymer;
  (d) simultaneously curing the substantially random interpolymer and compounding the intimate mixture to form a thermoplastic vulcanizate.

The subject invention provides a thermoset product comprising a crosslinked substantially random interpolymer comprising:
(1) from about 1 to about 65 mole percent of polymer units derived from
  (a) at least one vinylidene aromatic monomer, or
  (b) at least one hindered aliphatic vinylidene monomer, or
  (c) a combination of at least one vinylidene aromatic monomer and at least one hindered aliphatic vinylidene monomer; and
(2) from about 35 to about 99 mole percent of polymer units derived from at least one aliphatic α-olefin having from 2 to about 20 carbon atoms.

Another aspect of the present invention concerns a foamable composition comprising
(1) a partially or totally crosslinked composition comprising (A) from about 2 to about 100 percent by weight based on the combined weight of components (A) and (B) of at least one partially or totally crosslinked substantially random interpolymer comprising
  (1) from about 1 to about 65 mole percent of polymer units derived from (a) at least one vinylidene aromatic monomer, or (b) at least one hindered aliphatic vinylidene monomer, or (c) a combination of at least one vinylidene aromatic monomer and at least one hindered aliphatic vinylidene monomer, and
  (2) from about 35 to about 99 mole percent of polymer units derived from at least one aliphatic α-olefin having from 2 to about 20 carbon atoms;
(B) from about 0 to about 98 percent by weight based on the combined weight of components (A) and (B) of at least one of the following polymers:
  (1) a partially or totally crosslinked homopolymer containing polymer units derived from one or more α-olefins having from 2 to about 20 carbon atoms;
  (2) a partially or totally crosslinked copolymer containing (a) from about 2 to about 98 mole percent of polymer units derived from ethylene and (b) from about 98 to about 2 mole percent of polymer units derived from at least one of α-olefins having from 3 to about 20 carbon atoms; acrylic acid, methacrylic acid, vinyl alcohol, vinyl acetate, or diene having from 4 to about 20 carbon atoms;
  (3) a partially or totally crosslinked styrenic block copolymer;
  (4) a partially or totally crosslinked substantially random interpolymer defined as in (1) wherein the interpolymers (1) and (4) are distinct in that:
    (i) the amount of vinylidene aromatic monomer and/or hindered aliphatic or cycloaliphatic vinylidene monomer in any interpolymer of component (1) differs from that amount in any interpolymer of component (4) by at least 0.5 mole percent; and/or
    (ii) there is a difference of at least 20 percent between the number average molecular weight (Mn) in any interpolymer of component (1) and any interpolymer of component (4); and
(II) from about 0.1 to about 25 percent by weight based on the combined weight of components (I) and (II) of at least one foaming agent.

Another aspect of the present invention pertains to a method for cross-linking a polymer composition comprising (A) from about 2 to about 100 percent by weight based on the combined weight of components (A) and (B) of at least one partially or totally cross-linked substantially random interpolymer comprising
  (1) from about 1 to about 65 mole percent of polymer units derived from (a) at least one vinylidene aromatic monomer, or (b) at least one hindered aliphatic vinylidene monomer, or (c) a combination of at least one vinylidene aromatic monomer and at least one hindered aliphatic vinylidene monomer, and
  (2) from about 35 to about 99 mole percent of polymer units derived from at least one aliphatic α-olefin having from 2 to about 20 carbon atoms;
(B) from about 0 to about 98 percent by weight based on the combined weight of components (A) and (B) of at least one of the following polymers:
  (1) a homopolymer containing polymer units derived from one or more α-olefins having from 2 to about 20 carbon atoms;
  (2) a copolymer containing (a) from about 2 to about 98 mole percent of polymer units derived from ethylene and (b) from about 98 to about 2 mole percent of polymer units derived from at least one of α-olefins having from 3 to about 20 carbon atoms; acrylic acid, methacrylic acid, vinyl alcohol, vinyl acetate, diene having from 4 to about 20 carbon atoms;
  (3) a styrenic block copolymer;
  (4) an interpolymer defined as in (A) wherein the interpolymers (A) and (B4) are distinct in that:
    (i) the amount of vinylidene aromatic monomer and/or hindered aliphatic or cycloaliphatic vinylidene monomer in any interpolymer of component (A) differs from that amount in any interpolymer of component (B4) by at least 0.5 mole percent; and/or
    (ii) there is a difference of at least 20 percent between the number average molecular weight (Mn) in any interpolymer of component (A) and any interpolymer of component (B4);
which process for cross-linking comprises
  (a) subjecting the polymer composition to a sufficient amount of electron beam radiation to at least partially cross-link the polymer composition; or
  (b) contacting the polymer composition with a sufficient amount of at least one peroxide compound to at least partially cross-link the polymer composition; or (c) contacting the polymer composition with a sufficient amount of at least one silane compound to at least partially cross-link the polymer composition; or (d) contacting the polymer composition with a sufficient amount of at least one azide compound to at least partially cross-link the polymer composition; or (e) a combination of any two or more of the above cross-linking methods.

Another aspect of the present invention pertains to foams resulting from subjecting the aforementioned foamable polymer compositions to foaming conditions.

The subject invention further comprises fabricated parts comprising the thermoset elastomers or thermoplastic vulcanizates or partially or totally crosslinked foams of the invention.

These and other embodiments are more fully described in the following Detailed Description.

DETAILED DESCRIPTION OF THE INVENTION

The term "polymer" as used herein refers to a polymeric compound prepared by polymerizing monomers whether of the same or a different type. The generic term polymer thus embraces the term homopolymer, usually employed to refer to polymers prepared from only one type of monomer, and the term interpolymer as defined hereinafter.

As used herein, the terms "crosslinked interpolymers" and "thermoset interpolymers" are used interchangeably, and mean interpolymers which have greater than 10 percent gel as determined in accordance with ASTM D-2765-84.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "interpolymer" as used herein refers to polymers prepared by the polymerization of at least two different types of monomers. The generic term interpolymer thus includes copolymers, usually employed to refer to polymers prepared from two different monomers, and polymers prepared from more than two different types of monomers.

Statements herein that a polymer or interpolymer comprises or contains certain monomers, mean that such polymer or interpolymer comprises or contains polymerized therein units derived from such a monomer. For example, if a polymer is said to contain ethylene monomer, the polymer will have incorporated in it an ethylene derivative, that is, —CH$_2$—CH$_2$—.

The term "hydrocarbyl" means any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "monomer residue" or "polymer units derived from such monomer" means that portion of the polymerizable monomer molecule which resides in the polymer chain as a result of being polymerized with another polymerizable molecule to make the polymer chain.

The elastomeric thermoset compositions of the invention are preferably substantially random interpolymers comprising an olefin and a vinylidene aromatic monomer, which interpolymers have been crosslinked to yield thermoset behavior.

The term "substantially random" in the substantially random interpolymer resulting from polymerizing one or more α-olefin monomers and one or more vinylidene aromatic monomers or hindered aliphatic or cycloaliphatic vinylidene monomers, and optionally, with other polymerizable ethylenically unsaturated monomer(s) as used herein means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. Preferably, the substantially random interpolymer resulting from polymerizing one or more α-olefin monomers and one or more vinylidene aromatic monomer, and optionally, with other polymerizable ethylenically unsaturated monomer(s) does not contain more than 15 percent of the total amount of vinylidene aromatic monomer residue in blocks of vinylidene aromatic monomer of more than 3 units. More preferably, the interpolymer is not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Pseudorandom interpolymers are a subset of substantially random interpolymers. Pseudorandom interpolymers are characterized by an architecture in which all phenyl (or substituted phenyl) groups which are pendant from the polymer backbone are separated by two or more carbon backbone units. In other words, the pseudorandom interpolymers of the invention, in their noncrosslinked state, can be described by the following general formula (using styrene as the vinylidene aromatic monomer and ethylene as the α-olefin for illustration):

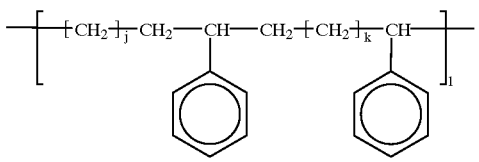

Noncrosslinked pseudorandom interpolymers are described in European Patent Publication 416,815-A, the relevant parts of which are incorporated herein by reference.

While not wishing to be bound by any particular theory, it is believed that during the addition polymerization reaction of, for example, ethylene and styrene, in the presence of a constrained geometry catalyst as described below, if a styrene monomer is inserted into the growing polymer chain, the next monomer inserted will be an ethylene monomer or a styrene monomer inserted in an inverted or "tail-to-tail" fashion. It is believed that after an inverted or "tail-to-tail" styrene monomer is inserted, the next monomer will be ethylene, as the insertion of a second styrene monomer at this point would place it too close to the inverted styrene monomer, that is, less than two carbon backbone units away.

Preferably, the substantially random interpolymer will be characterized as largely atactic, as indicated by a 13C-NMR spectrum in which the peak areas corresponding to the main chain methylene and methine carbons representing either meso diad sequences or racemic diad sequences does not exceed 75 percent of the total peak area of the main chain methylene and methine carbons.

Substantially random interpolymers which are suitable as components (A) and (B4) of the present invention include, substantially random interpolymers prepared by polymerizing one or more α-olefin monomers with one or more vinylidene aromatic monomers and/or one or more hindered aliphatic or cycloaliphatic vinylidene monomers, and optionally with other polymerizable ethylenically unsaturated monomer(s).

The interpolymers suitable for use as components (A) and (B4) in the present invention include, substantially random interpolymers prepared by polymerizing one or more α-olefin monomers with one or more vinylidene aromatic monomers and/or one or more hindered aliphatic or cycloaliphatic vinylidene monomers, and optionally with other polymerizable ethylenically unsaturated monomer(s).

Suitable α-olefin monomers include for example, α-olefin monomers containing from 2 to 20, preferably from 2 to 12, more preferably from 2 to 8 carbon atoms. Preferred such monomers include ethylene, propylene, butene-1, 4-methyl-1-pentene, hexene-1 and octene-1. Most preferred are ethylene or a combination of ethylene with $C_{3-8}$ α-olefins. These α-olefins do not contain an aromatic moiety.

Suitable vinylidene aromatic monomers which can be employed to prepare the interpolymers employed herein include, for example, those represented by the following formula:

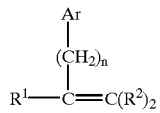

wherein $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to 4, preferably from zero to 2, most preferably zero. Exemplary monovinylidene aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl- ($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic monovinylidene monomer is styrene.

By the term "hindered aliphatic or cycloaliphatic vinylidene compounds", it is meant addition polymerizable vinylidene monomers corresponding to the formula:

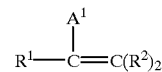

wherein $A^1$ is a sterically bulky, aliphatic or cycloaliphatic substituent of up to 20 carbons, $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. α-Olefin monomers containing from 2 to 20 carbon atoms and having a linear aliphatic structure such as propylene, butene-1, hexene-1 and octene-1 are not considered as hindered aliphatic monomers. Preferred hindered aliphatic or cycloaliphatic vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinylidene compounds are the various isomeric vinyl- ring substituted derivatives of cyclohexene and substituted cyclohexenes, and 5-ethylidene-2-norbornene. Especially suitable are 1-, 3-, and 4-vinylcyclohexene.

The interpolymers of one or more α-olefins and one or more monovinylidene aromatic monomers and/or one or more hindered aliphatic or cycloaliphatic vinylidene monomers employed in the present invention are substantially random polymers. These interpolymers usually contain from 0.5 to 65, preferably from 1 to 55, more preferably from 2 to 50 mole percent of at least one vinylidene aromatic monomer and/or hindered aliphatic or cycloaliphatic vinylidene monomer and from 35 to 99.5, preferably from 45 to 99, more preferably from 50 to 98 mole percent of at least one aliphatic α-olefin having from 2 to 20 carbon atoms.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

The number average molecular weight (Mn) of the polymers and interpolymers is usually greater than 5,000, preferably from 20,000 to 1,000,000, more preferably from 50,000 to 500,000.

Polymerizations and unreacted monomer removal at temperatures above the autopolymerization temperature of the respective monomers may result in formation of some amounts of homopolymer polymerization products resulting from free radical polymerization. For example, while preparing the substantially random interpolymer, an amount of atactic vinylidene aromatic homopolymer may be formed due to homopolymerization of the vinylidene aromatic monomer at elevated temperatures. The presence of vinylidene aromatic homopolymer is in general not detrimental for the purposes of the present invention and can be tolerated. The vinylidene aromatic homopolymer may be separated from the interpolymer, if desired, by extraction techniques such as selective precipitation from solution with a non solvent for either the interpolymer or the vinylidene aromatic homopolymer. For the purpose of the present invention it is preferred that no more than 20 weight percent, preferably less than 15 weight percent based on the total weight of the interpolymers of vinylidene aromatic homopolymer is present.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers can be prepared as described in U.S. application Ser. No. 07/545,403 filed Jul. 3, 1990 (corresponding to EP-A-0,416,815) by James C. Stevens et al. and is allowed U.S. application Ser. No. 08/469,828 filed Jun. 6, 1995 all of which are incorporated herein by reference in their entirety. Preferred operating conditions for such polymerization reactions are pressures from atmospheric up to 3,000 atmospheres and temperatures from −30° C. to 200° C.

The substantially random interpolymers can be prepared using a constrained geometry catalyst wherein the constrained geometry catalyst comprises a metal coordination complex comprising a metal of Group III or IV or the Lanthanide series of the Periodic Table of the Elements and a delocalized π-bonded moiety substituted with a constrain-inducing moiety, said complex having a constrained geometry about the metal atom such that the angle at the metal between the centroid of the delocalized, substituted π-bonded moiety and the center of at least one remaining substituent is less than such angle in a similar complex containing a similar π-bonded moiety lacking in such constrain-inducing substituent, and provided further that for such complexes comprising more than one delocalized, substituted π-bonded moiety, only one thereof for each metal atom of the complex is a cyclic, delocalized, substituted π-bonded moiety.

Examples of suitable catalysts and methods for preparing the substantially random interpolymers are disclosed in U.S. application Ser. No. 07/545,403, filed Jul. 3, 1990 corresponding to EP-A-416,815; U.S. application Ser. No. 07/702,475, filed May 20, 1991 corresponding to EP-A-514,828; U.S. application Ser. No. 07/876,268, filed May 1, 1992 corresponding to EP-A-520,732; U.S. application Ser. No. 08/241,523, filed May 12, 1994; as well as U.S. Pat. Nos.: 5,055,438; 5,057,475; 5,096,867; 5,064,802; 5,132,380; 5,189,192; 5,321,106; 5,347,024; 5,350,723; 5,374,696; 5,399,635; 5,460,993 and 5,556,928 all of which patents and applications are incorporated herein by reference in their entirety.

The substantially random α-olefin/vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,809 filed September 4, 1996 by Francis J. Timmers et al. These interpolymers contain additional signals with intensities greater than three times the peak to peak noise. These signals appear in the chemical shift range 43.75–44.25 ppm and 38.0–38.5 ppm. Specifically, major peaks are observed at 44.1, 43.9 and 38.2 ppm. A proton test NMR experiment indicates that the signals in the chemical shift region 43.75–44.25 ppm are methine carbons and the signals in the region 38.0–38.5 ppm are methylene carbons.

In order to determine the carbon$^{-13}$ NMR chemical shifts of the interpolymers described, the following procedures and conditions are employed. A five to ten weight percent polymer solution is prepared in a mixture consisting of 50 volume percent 1,1,2,2-tetrachloroethane-d$_2$ and 50 volume percent 0.10 molar chromium tris(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon$^{-13}$ NMR peaks but with slightly different chemical shifts.

These interpolymers are prepared by conducting the polymerization at temperatures of from −30° C. to 250° C. in the presence of such catalysts as those represented by the formula

wherein: each Cp is independently, each occurrence, a substituted cyclopentadienyl group πbound to M; E is C or Si; M is a group IV metal, preferably Zr or Hf, most preferably Zr; each R is independently, each occurrence, H, hydrocarbyl, silahydrocarbyl, or hydrocarbylsilyl, containing up to 30 preferably from 1 to 20 more preferably from 1 to 10 carbon or silicon atoms; each R' is independently, each occurrence, H, halo, hydrocarbyl, hyrocarbyloxy, silahydrocarbyl, hydrocarbylsilyl containing up to 30 preferably from 1 to 20 more preferably from 1 to 10 carbon or silicon atoms or two R' groups together can be a C$_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

wherein each R is independently, each occurrence, H, hydrocarbyl, silahydrocarbyl, or hydrocarbylsilyl, containing up to 30 preferably from 1 to 20 more preferably from 1 to 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate)

two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl(2-methyl-4-phenylindenyl)) zirconium dichloride, racemic-(dimethylsilanediyl(2-methyl-4-phenylindenyl))zirconium 1,4-diphenyl-1,3-butadiene, racemic-(dimethylsilanediyl(2-methyl-4-phenylindenyl))zirconium di-$C_{1-4}$ alkyl, racemic-(dimethylsilanediyl(2-methyl-4-phenylindenyl))zirconium di-$C_{1-4}$ alkoxide, or any combination thereof and the like.

Further preparative methods for the interpolymer component (A) of the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am.Chem.Soc.Div.Polym.Chem.*) Volume 35, pages 686,687 [1994]) have reported copolymerization using a $MgCl_2/TiCl_4/NdCl_3/Al(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_4/NdCl_3/MgCl_2/Al(Et)_3$ catalyst. Sernetz and Mulhaupt, (*Macromol. Chem. Phys.*, v. 197, pp 1071–1083, 1997) have described the influence of polymerization conditions on the copolymerization of styrene with ethylene using $Me_2Si(Me_4Cp)(N\text{-}tert\text{-}butyl)TiCl_2/$methylaluminoxane Ziegler-Natta catalysts. The manufacture of α-olefin/vinyl aromatic monomer interpolymers such as propylene/styrene and butene/styrene are described in U.S. Pat. No. 5,244,996, issued to Mitsui Petrochemical Industries Ltd. All the above methods disclosed for preparing the interpolymer component are incorporated herein by reference.

The level of vinylidene aromatic monomer incorporated in the thermoset elastomers of the invention is at least 30, preferably at least 35 weight percent based on the weight of the interpolymer. The vinylidene aromatic monomer is typically incorporated in the interpolymers of the invention in an amount less than 70, more typically less than 60 weight percent based on the weight of the interpolymer.

The substantially random interpolymers usually contain from about 0.5 to about 65, preferably from about 1 to about 55, more preferably from about 2 to about 50 mole percent of at least one vinylidene aromatic monomer and/or hindered aliphatic or cycloaliphatic vinylidene monomer and from about 35 to about 99.5, preferably from about 45 to about 99, more preferably from about 50 to about 98 mole percent of at least one aliphatic α-olefin having from 2 to about 20 carbon atoms.

One or more dienes can optionally be incorporated into the interpolymer to provide functional sites of unsaturation on the interpolymer useful, for example, to participate in crosslinking reactions. While conjugated dienes such as butadiene, 1,3-pentadiene (that is, piperylene), or isoprene may be used for this purpose, nonconjugated dienes are preferred. Typical nonconjugated dienes include, for example the open-chain nonconjugated diolefins such as 1,4-hexadiene (see U.S. Pat. No. 2,933,480) and 7-methyl-1,6-octadiene (also known as MOCD); cyclic dienes; bridged ring cyclic dienes, such as dicyclopentadiene (see U.S. Pat. No. 3,211,709); or alkylidenenorbornenes, such as methylenenorbornene or ethylidenenorbornene (see U.S. Pat. No. 3,151,173). The nonconjugated dienes are not limited to those having only two double bonds, but rather also include those having three or more double bonds.

The diene is incorporated in the elastomers of the invention in an amount of from 0 to 15 weight percent based on the total weight of the interpolymer. When a diene is employed, it will preferably be provided in an amount of at least 2 weight percent, more preferably at least 3 weight percent, and most preferably at least 5 weight percent, based on the total weight of the interpolymer. Likewise, when a diene is employed, it will be provided in an amount of no more than 15, preferably no more than 12 weight percent based on the total weight of the interpolymer.

The number average molecular weight (Mn) of the polymers and interpolymers is usually greater than about 5,000, preferably from about 20,000 to about 1,000,000, more preferably from about 50,000 to about 500,000.

The conditions for polymerizing the a-olefin, vinylidene aromatic, and optional diene are generally those useful in the solution polymerization process, although the application of the present invention is not limited thereto. High pressure, slurry and gas phase polymerization processes are also believed to be useful, provided the proper catalysts and polymerization conditions are employed.

In general, the polymerization useful in the practice of the subject invention may be accomplished at conditions well known in the prior art for Ziegler-Natta or Kaminsky-Sinn type polymerizations. In particular, the polymerization will typically involve pressures from atmospheric up to 1000 atmospheres (100 MPa) and temperatures from 0° C. to 250° C.

While polymerizing and isolating the substantially random interpolymer, a small amount of atactic vinylidene aromatic homopolymer may be formed due to homopolymerization of the vinylidene aromatic monomer. In general, the higher the polymerization temperature is, the higher is the amount of homopolymer formed. The presence of vinylidene aromatic homopolymer is in general not detrimental for the purposes of the present invention and can be tolerated. For the purpose of the present invention it is preferred that no more than 20 weight percent, preferably less than 15 weight percent based on the total weight of the interpolymers of vinylidene aromatic homopolymer is present. If desired, the vinylidene aromatic homopolymer may be at least partially separated from the substantially random interpolymer, if desired, such as by extraction with a suitable extracting solvent.

The substantially random interpolymers may be modified by typical grafting, crosslinking, hydrogenation, functionalizing, or other reactions well known to those skilled in the art, provided that the elastomeric properties of the interpolymers are not substantially affected. The polymers may be readily sulfonated or chlorinated to provide functionalized derivatives according to established techniques.

Compounding and Curing the Substantially Random Interpolymers

The thermoset elastomers of the invention may include various additives, such as carbon black, silica, titanium dioxide, colored pigments, clay, zinc oxide, stearic acid, accelerators, curing agents, sulfur, stabilizers, antidegradants, processing aids, adhesives, tackifiers, plasticizers, wax, precrosslinking inhibitors, discontinuous fibers (such as wood cellulose fibers) and extender oils. Such additives may be provided either prior to, during, or subsequent to curing the substantially random interpolymers. The substantially random interpolymers are typically mixed with a filler, an oil, and a curing agent at an elevated temperature to compound them. The compounded material is the subsequently cured at a temperature which is typically greater than that employed during compounding.

Preferably, carbon black will be added to the substantially random interpolymer prior to curing. Carbon black is typically added to improve the tensile strength or toughness of the compounded product, but can also be used as an extender or to mask the color of the compounded product. Carbon black will typically be provided in an amount from 0 to 80 weight percent, typically from 0.5 to 50 weight percent, based on the total weight of the formulation. When the carbon black is employed to mask a color, it is typically employed in the range of 0.5 to 10 weight percent, based on the weight of the formulation. When the carbon black is employed to increase toughness and/or decrease the cost of the formulation, it is typically employed in amounts greater than 10 weight percent based on the weight of the formulation.

Moreover, preferably, one or more extender oils will be added to the substantially random interpolymer prior to curing. Extender oils are typically added to improve processability and low temperature flexability, as well as to decrease cost. Suitable extender oils are listed in Rubber World Blue Book 1975 Edition, Materials and Compounding Ingredients for Rubber, pages 145–190. Typical classes of extender oils include aromatic, naphthenic, and paraffinic extender oils. The extender oil(s) will typically be provided in an amount from 0 to 50 weight percent. When employed, the extender oil will typically be provided in an amount of at least 5 weight percent, more typically in an amount of from 15 to 25 weight percent, based on the total weight of the formulation.

The curing agent(s) will typically be provided in an amount of from 0.5 to 12 weight percent, based on the total weight of the formulation.

Suitable curing agents include peroxides, phenols, azides, aldehyde-amine reaction products, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations thereof. See Encyclopedia of Chemical Technology, Vol. 17, 2nd edition, Interscience Publishers, 1968; also Organic Peroxides, Daniel Seern, Vol. 1, Wiley-Interscience, 1970).

Suitable peroxides include aromatic diacyl peroxides; aliphatic diacyl peroxides; dibasic acid peroxides; ketone peroxides; alkyl peroxyesters; alkyl hydroperoxides (for example, diacetylperoxide; dibenzoylperoxide; bis-2,4-dichlorobenzoyl peroxide; di-tert-butyl peroxide; dicumylperoxode; tert-butylperbenzoate; tert-butylcumylperoxide; 2,5-bis (t-butylperoxy)-2,5-dimethylhexane; 2,5-bis (t-butylperoxy)-2,5-dimethylhexyne-3; 4,4,4',4'-tetra-(t-butylperoxy)-2,2-dicyclohexylpropane; 1,4-bis-(t-butylperoxyisopropyl)-benzene; 1,1-bis-(t-butylperoxy)-3,3,5-trimethylcyclohexane; lauroyl peroxide; succinic acid peroxide; cyclohexanone peroxide; t-butyl peracetate; butyl hydroperoxide; etc.

Suitable phenols are disclosed in U.S. Pat. No. 4,311,628, the disclosure of which is incorporated herein by reference. One example of a phenolic cure agent is the condensation product of a halogen substituted phenol or a $C_1$–$C_{10}$ alkyl substituted phenol with an aldehyde in an alkaline medium, or by condensation of bifunctional phenoldialcohols. One such class of phenolic cure agents is dimethylol phenols substituted in the para position with $C_5$–$C_{10}$ alkyl group(s).

Also suitable are halogenated alkyl substituted phenol curing agents, and cure systems comprising methylol phenolic resin, a halogen donor, and a metal compound.

Suitable azides include azidoformates, such as tetramethylenebis(azidoformate) (see, also, U.S. Pat. No. 3,284,421, Breslow, Nov. 8, 1966); aromatic polyazides, such as 4,4'-diphenylmethane diazide (see, also, U.S. Pat. No. 3,297,674, Breslow et al., Jan. 10, 1967); and sulfonazides, such as p,p'-oxybis(benzene sulfonyl azide).

The poly(sulfonyl azide) is any compound having at least two sulfonyl azide groups ($-SO_2N_3$) reactive with the substantially random interpolymer. Preferably the poly (sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the substantially random interpolymer and the sulfonyl azide, more preferably at least 1, more preferably at least 2, most preferably at least 3 carbon, oxygen or silicon, preferably carbon, atoms between functional groups. The term inertly substituted refers to substitution with atoms or groups which do not undesirably interfere with the desired reaction(s) or desired properties of the resulting crosslinked polymers. Such groups include fluorine, aliphatic or aromatic ether, siloxanes, as well as sulfonyl azide groups when more than two substantially random interpolymer chains are to be joined. Suitable structures include R as aryl, alkyl, aryl alkaryl, arylalkyl silane, or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis(sulfonyl azides). Poly(sulfonyl)azides include such compounds as 1,5-pentane bis(sulfontlazide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido)biphenyl, 4,4'-diphenyl ether bis (sulfonyl azide) and bis(4-sulfonyl azidophenyl)methane, and mixtures thereof.

To crosslink, the poly(sulfonyl azide) is used in a crosslinking amount, that is an amount effective to crosslink the substantially random interpolymer as compared with the starting material substantially random interpolymer, that is sufficient poly(sulfonyl azide) to result in the formation of at least about 10 weight percent gels as evidenced by insolubility of the gels in boiling xylene when tested according to ASTM D-2765A-84. The amount is preferably at least about 0.5, more preferably at least about 1.0, most preferably 2.0 weight percent poly(sulfonyl azide) based on total weight of substantially random interpolymer, with these values depending on the molecular weight of the azide and the molecular weight or melt index of the substantially random interpolymer. To avoid uncontrolled heating and unnecessary cost, degradation of physical properties, the amount of poly(sulfonyl azide) is preferably less than about 10 weight percent, more preferably less than about 5.

For crosslinking, the sulfonyl azide is admixed with the substantially random interpolymer and heated to at least the decomposition temperature of the sulfonyl azide, that is usually greater than 100° C. and most frequently greater than 150° C. The preferred temperature range depends on the nature of the azide that is used. For example, in the case of 4,4'-disulfonylazidediphenylether the preferred temperature range is greater than about 150° C., preferably greater than about 160° C., more preferably greater than about 185° C., most preferably greater than 190° C. Preferably, the upper temperature is less than 250° C.

Suitable aldehyde-amine reaction products include formaldehyde-ammonia; formaldehyde-ethylchloride-ammonia; acetaldehyde-ammonia; formaldehyde-aniline; butyraldehyde-aniline; and heptaldehyde-aniline.

Suitable substituted ureas include trimethylthiourea; diethylthiourea; dibutylthiourea; tripentylthiourea; 1,3-bis(2-benzothiazolylmercaptomethyl)urea; and N,N-diphenylthiourea.

Suitable substituted guanidines include diphenylguanidine; di-o-tolylguanidine; diphenylguanidine phthalate; and the di-o-tolylguanidine salt of dicatechol borate.

Suitable substituted xanthates include zinc ethylxanthate; sodium isopropylxanthate; butylxanthic disulfide; potassium isopropylxanthate; and zinc butylxanthate.

Suitable dithiocarbamates include copper dimethyl-, zinc dimethyl-, tellurium diethyl-, cadmium dicyclohexyl-, lead dimethyl-, lead dimethyl-, selenium dibutyl-, zinc pentamethylene-, zinc didecyl-, and zinc isopropyloctyl-dithiocarbamate.

Suitable thiazoles include 2-mercaptobenzothiazole, zinc mercaptothiazolyl mercaptide, 2-benzothiazolyl-N,N-diethylthiocarbamyl sulfide, and 2,2'-dithiobis(benzothiazole).

Suitable imidazoles include 2-mercaptoimidazoline and 2-mercapto-4,4,6-trimethyldihydropyrimidine.

Suitable sulfenamides include N-t-butyl-2-benzothiazole-, N-cyclohexylbenzothiazole-, N,N-diisopropylbenzothiazole-, N-(2,6-dimethylmorpholino)-2-benzothiazole-, and N,N-diethylbenzothiazole-sulfenamide.

Suitable thiuramidisulfides include N,N'-diethyl-, tetrabutyl-, N,N'-diisopropyldioctyl-, tetramethyl-, N,N'-dicyclohexyl-, and N,N'-tetralauryl-thiuramidisulfide.

Those skilled in the art will be readily able to select amounts of crosslinking agent, with the amount selected taking into account characteristics of the substantially random interpolymer or blend comprising such substantially random interpolymer, such as molecular weight, molecular weight distribution, comonomer content, the presence of crosslinking enhancing coagents, additives (such as oil) etc. Since it is expressly contemplated that the substantially random interpolymer may be blended with other polymers prior to crosslinking, those skilled in the art may use the following guidelines as a reference point in optimizing the amount of crosslinking agent preferred for the particular blends in question.

For instance, in the case of crosslinking using dicumyl peroxide, when the substantially random interpolymer is characterized as having less than about 35 weight percent styrene, dicumyl peroxide will typically be provided in an amount of at least about 0.1 weight percent, preferably at least about 1 weight percent, more preferably at least about 2 weight percent based on the combined weight of polymer and peroxide.

Further, in the case of crosslinking using dicumyl peroxide, when the substantially random interpolymer is characterized as having from at least about 35 to about 60 weight percent styrene, dicumyl peroxide will typically be provided in an amount of at least about 0.3 weight percent, preferably at least about 3 weight percent, more preferably at least about 4 weight percent based on the combined weight of polymer and peroxide.

Further, in the case of crosslinking using dicumyl peroxide, when the substantially random interpolymer is characterized as having greater than about 60 weight percent styrene, dicumyl peroxide will typically be provided in an amount of at least about 1 weight percent, preferably at least about 6 weight percent, more preferably at least about 9 weight percent based on the combined weight of polymer and peroxide.

Typically, the amount of crosslinking agent employed will not exceed that which is required to effect the desired level of crosslinking. For instance, dicumyl peroxide will typically not be employed in an amount greater than about 15 weight percent, preferably no more than about 12 weight percent based on the combined weight of polymer and peroxide.

Alternatively, silane crosslinking agents may be employed. In this regard, any silane that will effectively graft to and crosslink the substantially random interpolymers can be used in the practice of this invention. Suitable silanes include unsaturated silanes that comprise an ethylenically unsaturated hydrocarbyl group, such as a vinyl, allyl, isopropenyl, butenyl, cyclohexenyl or γ-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al. Vinyl trimethoxy silane, vinyl triethoxy silane, γ-(meth)acryloxy propyl trimethoxy silane and mixtures of these silanes are the preferred silane crosslinkers for use in this invention.

The amount of silane crosslinking agent used in the practice of this invention can vary widely depending upon the nature of the substantially random interpolymer, the silane employed, the processing conditions, the amount of grafting initiator, the ultimate application, and similar factors. Typically, in the case of crosslinking using vinyltrimethoxysilane (VTMOS), the VTMOS will typically be provided in an amount of at least about 0.1 weight percent, preferably at least about 1 weight percent, more preferably at least about 3 weight percent based on the combined weight of polymer and silane.

Considerations of convenience and economy are usually the two principal limitations on the maximum amount of silane crosslinker used in the practice of this invention. For instance, when VTMOS is employed, the maximum amount of VTMOS employed will typically not exceed 10 weight percent, and more preferably does not exceed 8, and most preferably does not exceed 6 weight percent based on the combined weight of polymer and silane.

The silane crosslinking agent is grafted to the substantially random interpolymer by any conventional method, typically in the presence of a free radical initiator e.g. peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)

hexane, lauryl peroxide, and tert-butyl peracetate. A suitable azo compound is azobisisobutyl nitrite.

Those skilled in the art will be readily able to select amounts of initiator employed, with the amount selected taking into account characteristics of the substantially random interpolymer, such as molecular weight, molecular weight distribution, comonomer content, as well as the presence of crosslinking enhancing coagents, additives (such as oil) etc.

The amount of initiator will depend upon the percent of monovinylidene aromatic or hindered aliphatic or cycloaliphatic comonomer present in the substantially random interpolymer. For instance, in the case of crosslinking using VTMOS, when the substantially random interpolymer is characterized as having less than about 35 weight percent styrene, dicumyl peroxide will typically be provided in an amount of at least about 250 ppm, preferably at least about 500 ppm, more preferably at least about 1,500 ppm based on the combined weight of polymer, silane and initiator.

Further, in the case of crosslinking using VTMOS, when the substantially random interpolymer is characterized as having from at least about 35 to about 60 weight percent styrene, dicumyl peroxide will typically be provided in an amount of at least about 400 ppm, preferably at least about 1,000 ppm, more preferably at least about 2,000 ppm based on the combined weight of polymer, silane and initiator.

Further, in the case of crosslinking using VTMOS, when the substantially random interpolymer is characterized as having greater than about 60 weight percent styrene, dicumyl peroxide will typically be provided in an amount of at least about 500 ppm, preferably at least about 1,500 ppm, more preferably at least about 3000 ppm combined weight of polymer, silane and initiator.

Typically, the amount of initiator employed will not exceed that which is required to effect grafting. For instance, dicumyl peroxide will typically not be employed in an amount greater than about 20,000 ppm, preferably not greater than 10,000 ppm combined weight of polymer, silane and initiator.

While any conventional method can be used to graft the silane crosslinker to the substantially random interpolymer, one preferred method is blending the two with the initiator in the first stage of a reactor extruder, such as a Buss kneader. The grafting conditions can vary, but the melt temperatures are typically between 160° C. and 260° C. C., preferably between 190° C. and 230° C., depending upon the residence time and the half life of the initiator.

Cure is promoted with a crosslinking catalyst, and any catalyst that will provide this function can be used in this invention. These catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective for this invention. The catalyst (or mixture of catalysts) is present in a catalytic amount, typically between about 0.015 and about 0.035 weight percent combined weight of polymer, silane, initiator and catalyst.

Rather than employing a chemical crosslinking agent, crosslinking may be effected by use of radiation. Useful radiation types include electron beam or beta ray, gamma rays, X-rays, or neutron rays. Radiation is believed to effect crosslinking by generating polymer radicals which may combine and crosslink. Additional teachings concerning radiation crosslinking are seen in C. P. Park, "Polyolefin Foam" Chapter 9, Handbook of Polymer Foams and Technology, D. Klempner and K. C. Frisch, eds., Hanser Publishers, New York (1991), pages 198–204, which is incorporated herein by reference.

Radiation dosage depends upon the composition of the substantially random interpolymer. Generally speaking, as the amount of the vinylidene aromatic or hindered aliphatic or cycloaliphatic comonomer increases, greater dosages will be required to cause the desired level of crosslinking, that is, to lead to compositions exhibiting at least 10 percent gel, preferably at least 20 percent gel, and more preferably at least 30 percent gel. Those skilled in the art will be readily able to select suitable radiation levels, taking into account such variables as thickness and geometry of the article to be irradiated, as well as to characteristics of the substantially random interpolymer, such as molecular weight, molecular weight distribution, comonomer content, the presence of crosslinking enhancing coagents, additives (such as oil), etc.

For instance, in the case of crosslinking of 80 mil plaques by e-beam radiation, when the substantially random interpolymer is characterized as having less than about 35 weight percent styrene, typical radiation dosages will be greater than about 5 Mrad, preferably greater than about 10 Mrad, more preferably greater than about 15 Mrad. Electronic radiation dosages are referred to herein in terms of the radiation unit "RAD", with one million RADs or a megarad being designated as "Mrad."

Further, in the case of crosslinking of 80 mil plaques by e-beam radiation, when the substantially random interpolymer is characterized as having from at least about 35 to about 60 weight percent styrene, typical radiation dosages will be greater than about 5 Mrad, preferably greater than about 15 Mrad, more preferably greater than about 20 Mrad.

Further, in the case of crosslinking of 80 mil plaques by e-beam radiation, when the substantially random interpolymer is characterized as having greater than about 60 weight percent styrene, typical radiation dosages will be greater than about 10 Mrad, preferably greater than about 15 Mrad, more preferably greater than about 20 Mrad.

Typically, the dosage will not exceed that which is required to effect the desired level of crosslinking. For instance, dosages above about 80 Mrad are not typically employed.

In the case of substantially random interpolymers not including the optional diene component, peroxide or azide cure systems are preferred; in the case of interpolymer with high styrene content (>than 50 wt. percent) azide cure systems are preferred; in the case of substantially random interpolymers including the optional diene component, sulfur-based (for example, containing sulfur, a dithiocarbamate, a thiazole, an imidazole, a sulfenamide, a thiuramidisulfide or combinations thereof) and phenolic cure systems are preferred.

In certain embodiments of the claimed invention, dual cure systems, which use a combination of heat, moisture cure, and radiation steps, may be effectively employed. Dual cure systems are disclosed and claimed in U.S. patent application Ser. No. 536,022, filed on Sep. 29, 1995, in the names of K. L. Walton and S. V. Karande, incorporated herein by reference. For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc.

Preparation of Polymer Blends

Olefinic polymers suitable for use as components (B1, B2 and B3) employed in the present invention are aliphatic α-olefin homopolymers or interpolymers, or interpolymers of one or more aliphatic α-olefins and one or more non-aromatic monomers interpolymerizable therewith such as $C_2$–$C_{20}$ α-olefins or those aliphatic α-olefins having from 2 to about 20 carbon atoms and containing polar groups. Suitable aliphatic α-olefin monomers which introduce polar groups into the polymer include, for example, ethylenically unsaturated nitriles such as acrylonitrile, methacrylonitrile, ethacrylonitrile, etc.; ethylenically unsaturated anhydrides such as maleic anhydride; ethylenically unsaturated amides such as acrylamide, methacrylamide etc.; ethylenically unsaturated carboxylic acids (both mono- and difunctional) such as acrylic acid and methacrylic acid, etc.; esters (especially lower, e.g. $C_1$–$C_6$, alkyl esters) of ethylenically unsaturated carboxylic acids such as methyl methacrylate, ethyl acrylate, hydroxyethylacrylate, n-butyl acrylate or methacrylate, 2-ethyl-hexylacrylate etc.; ethylenically unsaturated vinyl alcohols, such as ethylene vinyl alcohol (EVOH); ethylenically unsaturated dicarboxylic acid imides such as N-alkyl or N-aryl maleimides such as N-phenyl maleimide, etc. Preferably such monomers containing polar groups are acrylic acid, vinyl acetate, maleic anhydride and acrylonitrile. Halogen groups which can be included in the polymers from aliphatic α-olefin monomers include fluorine, chlorine and bromine; preferably such polymers are chlorinated polyethylenes (CPEs). Preferred olefinic polymers for use in the present invention are homopolymers or interpolymers of an aliphatic, including cycloaliphatic, α-olefin having from 2 to 18 carbon atoms. Suitable examples are homopolymers of ethylene or propylene, and interpolymers of two or more α-olefin monomers. Other preferred olefinic polymers are interpolymers of ethylene and one or more other α-olefins having from 3 to 8 carbon atoms. Preferred comonomers include 1-butene, 4-methyl-1-pentene, 1-hexene, and 1-octene. The olefinic polymer blend component (B) may also contain, in addition to the α-olefin, one or more non-aromatic monomers interpolymerizable therewith. Such additional interpolymerizable monomers include, for example, $C_4$–$C_{20}$ dienes, preferably, butadiene or 5-ethylidene-2-norbornene. The olefinic polymers can be further characterized by their degree of long or short chain branching and the distribution thereof.

One class of olefinic polymers is generally produced by a high pressure polymerization process using a free radical initiator resulting in the traditional long chain branched low density polyethylene (LDPE). LDPE employed in the present composition usually has a density of less than 0.94 g/cc (ASTM D 792) and a melt index of from 0.01 to 100, and preferably from 0.1 to 50 grams per 10 minutes (as determined by ASTM Test Method D 1238, condition I).

Another class is the linear olefin polymers which have an absence of long chain branching, as the traditional linear low density polyethylene polymers (heterogeneous LLDPE) or linear high density polyethylene polymers (HDPE) made using Ziegler polymerization processes (for example, U.S. Pat. No. 4,076,698 (Anderson et al.), sometimes called heterogeneous polymers.

HDPE consists mainly of long linear polyethylene chains. The HDPE employed in the present composition usually has a density of at least 0.94 grams per cubic centimeter (g/cc) as determined by ASTM Test Method D 792, and a melt index (ASTM-1238, condition I) in the range of from 0.01 to 100, and preferably from 0.1 to 50 grams per 10 minutes.

The heterogeneous LLDPE employed in the present composition generally has a density of from 0.85 to 0.94 g/cc (ASTM D 792), and a melt index (ASTM-1238, condition I) in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

A further class is that of the uniformly branched or homogeneous ethylene polymers. The homogeneous linear ethylene polymers contain no long chain branches and have only branches derived from the monomers (if having more than two carbon atoms). Homogeneous linear ethylene polymers include those made as described in U.S. Pat. No. 3,645,992 (Elston), and those made using so-called single site catalysts in a batch reactor having relatively high olefin concentrations (as described in U.S. Pat. Nos. 5,026,798 and 5,055,438 (Canich). The uniformly branched/homogeneous linear ethylene polymers are those polymers in which the comonomer is randomly distributed within a given interpolymer molecule and wherein the interpolymer molecules have a similar ethylene/comonomer ratio within that interpolymer.

The homogeneous linear ethylene polymer employed in the present composition generally has a density of from 0.85 to 0.94 g/cc (ASTM D 792), and a melt index (ASTM-1238, condition I) in the range of from 0.01 to 100, and preferably from 0.1 to 50 grams per 10 minutes. Preferably the homogeneous linear ethylene polymer is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

Further, there is the class of substantially linear olefin polymers (SLOP) that may advantageously be used in component (B) of the blends of the present invention. These polymers have a processability similar to LDPE, but the strength and toughness of LLDPE. Similar to the traditional homogeneous polymers, the substantially linear ethylene/α-olefin interpolymers have only a single melting peak, as opposed to traditional Ziegler polymerized heterogeneous linear ethylene/α-olefin interpolymers which have two or more melting peaks (determined using differential scanning calorimetry). Substantially linear olefin polymers are disclosed in U.S. Pat. Nos. 5,272,236 and 5,278,272 which are incorporated herein by reference.

The density of the SLOP as measured in accordance with ASTM D-792 is generally from 0.85 g/cc to 0.97 g/cc, preferably from 0.85 g/cc to 0.955 g/cc, and especially from 0.85 g/cc to 0.92 g/cc.

The melt index, according to ASTM D-1238, Condition 190° C./2.16 kg (also known as $I_2$), of the SLOP is generally from 0.01 g/10 min. to 1000 g/10 min., preferably from 0.01 g/10 min. to 100 g/10 min., and especially from 0.01 g/10 min. to 10 g/10 min.

Also, included are the ultra low molecular weight ethylene polymers and ethylene/α-olefin interpolymers described in the patent application entitled Ultra-low Molecular Weight Polymers, filed provisionally on Jan. 22, 1996 in the names of M. L. Finlayson, C. C. Garrison, R. E. Guerra, M. J. Guest, B. W. S. Kolthammer, D. R. Parikh, and S. M. Ueligger, which is incorporated herein by reference. These ethylene/α-olefin interpolymers have $I_2$ melt indices greater than 1,000, or a number average molecular weight (Mn) less than 11,000.

The SLOP can be a homopolymer of $C_2$–$C_{20}$ olefins, such as ethylene, propylene, 4-methyl-1-pentene, etc., or it can be an interpolymer of ethylene with at least one $C_3$–$C_{20}$ α-olefin and/or $C_2$–$C_{20}$ acetylenically unsaturated monomer and/or $C_4$–$Cl_{18}$ diolefin. SLOP can also be an interpolymer of ethylene with at least one of the above $C_3$–$C_{20}$ α-olefins, diolefins and/or acetylenically unsaturated monomers in combination with other unsaturated monomers.

Especially preferred olefin polymers suitable for use as component (B) comprise LDPE, HDPE, heterogeneous LLDPE, homogeneous linear ethylene polymers, SLOP, polypropylene (PP), especially isotactic polypropylene and rubber toughened polypropylenes, or ethylene-propylene interpolymers (EP), or chlorinated polyolefins (CPE), or ethylene-vinyl acetate copolymers (EVA), or ethylene-acrylic acid copolymers (EAA), or any combination thereof.

The term "block copolymer" is used herein to mean elastomers having at least one block segment of a hard polymer unit and at least one block segment of a rubber monomer unit. However, the term is not intended to include thermoelastic ethylene interpolymers which are, in general, random polymers. Preferred block copolymers contain hard segments of styrenic type polymers in combination with saturated or unsaturated rubber monomer segments. The structure of the block copolymers useful in the present invention is not critical and can be of the linear or radial type, either diblock or triblock, or any combination of thereof. Preferably, the predominant structure is that of triblocks and more preferably that of linear triblocks.

The preparation of the block copolymers useful herein is not the subject of the present invention. Methods for the preparation of such block copolymers are known in the art. Suitable catalysts for the preparation of useful block copolymers with unsaturated rubber monomer units include lithium based catalysts and especially lithium-alkyls. U.S. Pat. No. 3,595,942 describes suitable methods for hydrogenation of block copolymers with unsaturated rubber monomer units to from block copolymers with saturated rubber monomer units. The structure of the polymers is determined by their methods of polymerization. For example, linear polymers result by sequential introduction of the desired rubber monomer into the reaction vessel when using such initiators as lithium-alkyls or dilithiostilbene, or by coupling a two segment block copolymer with a difunctional coupling agent. Branched structures, on the other hand, may be obtained by the use of suitable coupling agents having a functionality with respect to the block copolymers with unsaturated rubber monomer units of three or more. Coupling may be effected with multifunctional coupling agents such as dihaloalkanes or alkenes and divinyl benzene as well as with certain polar compounds such as silicon halides, siloxanes or esters of monohydric alcohols with carboxylic acids. The presence of any coupling residues in the polymer may be ignored for an adequate description of the block copolymers forming a part of the composition of this invention.

Suitable block copolymers having unsaturated rubber monomer units includes, but is not limited to, styrene-butadiene (SB), styrene-isoprene(SI), styrene-butadiene-styrene (SBS), styrene-isoprene-styrene (SIS), a-methylstyrene-butadiene-a-methylstyrene and a-methylstyrene-isoprene-a-methylstyrene.

The styrenic portion of the block copolymer is preferably a polymer or interpolymer of styrene and its analogs and homologs including α-methylstyrene and ring-substituted styrenes, particularly ring-methylated styrenes. The preferred styrenics are styrene and a-methylstyrene, and styrene is particularly preferred.

Block copolymers with unsaturated rubber monomer units may comprise homopolymers of butadiene or isoprene and copolymers of one or both of these two dienes with a minor amount of styrenic monomer. When the monomer employed is butadiene, it is preferred that between 35 and 55 mol percent of the condensed butadiene units in the butadiene polymer block have 1,2 configuration. Thus, when such a block is hydrogenated, the resulting product is, or resembles a regular copolymer block of ethylene and 1-butene (EB). If the conjugated diene employed is isoprene, the resulting hydrogenated product is or resembles a regular copolymer block of ethylene and propylene (EP). Preferred block copolymers with saturated rubber monomer units comprise at least one segment of a styrenic unit and at least one segment of an ethylene-butene or ethylene-propylene copolymer. Preferred examples of such block copolymers with saturated rubber monomer units include styrene/ethylene-butene copolymers, styrene/ethylene-propylene copolymers, styrene/ethylene-butene/styrene (SEBS) copolymers, and styrene/ethylene-propylene/styrene (SEPS) copolymers.

Hydrogenation of block copolymers with unsaturated rubber monomer units is preferably effected by use of a catalyst comprising the reaction products of an aluminum alkyl compound with nickel or cobalt carboxylates or alkoxides under such conditions as to substantially completely hydrogenate at least 80 percent of the aliphatic double bonds while hydrogenating no more than 25 percent of the styrenic aromatic double bonds. Preferred block copolymers are those where at least 99 percent of the aliphatic double bonds are hydrogenated while less than 5 percent of the aromatic double bonds are hydrogenated.

The proportion of the styrenic blocks is generally between 8 and 65 percent by weight of the total weight of the block copolymer. Preferably, the block copolymers contain from 10 to 35 weight percent of styrenic block segments and from 90 to 65 weight percent of rubber monomer block segments, based on the total weight of the block copolymer.

The average molecular weights of the individual blocks may vary within certain limits. In most instances, the styrenic block segments will have number average molecular weights in the range of 5,000 to 125,000, preferably from 7,000 to 60,000 while the rubber monomer block segments will have average molecular weights in the range of 10,000 to 300,000, preferably from 30,000 to 150,000. The total average molecular weight of the block copolymer is typically in the range of 25,000 to 250,000, preferably from 35,000 to 200,000. These molecular weights are most accurately determined by tritium counting methods or osmotic pressure measurements.

Further, the various block copolymers suitable for use in the present invention may be modified by graft incorporation of minor amounts of functional groups, such as, for example, maleic anhydride by any of the methods well known in the art.

Block copolymers useful in the present invention are commercially available, such as, for example, supplied by Shell Chemical Company under the designation of KRATON and supplied by Dexco Polymers under the designation of VECTOR.

Likewise, blends of the substantially random interpolymer with polyvinylchloride (PVC) or ethylene vinyl alcohol (EVOH) may be suitably employed.

Preparation of Thermoplastic Vulcanizates

The thermoset compositions of the invention may be incorporated into polyolefins to form thermoplastic vulcanizates. The proportions of ingredients utilized will vary somewhat with the particular polyolefin employed, with the desired application, as well as with the character of the crosslinked substantially random interpolymer and compounding ingredients. Typically, as the amount of the crosslinked substantially random interpolymer increases, the stiffness of the resultant thermoplastic vulcanizate decreases. The thermoplastic vulcanizates of the invention will typically comprise from 10 to 90 weight percent of the polyolefin and from 10 to 90 weight percent of the crosslinked substantially random interpolymer.

Suitable polyolefins include thermoplastic, crystalline, high molecular weight polymers prepared by the polymerization of one or more monoolefins. Examples of suitable polyolefins include ethylene and the isotactic and syndiotactic monoolefin polymer resins, such as propylene, 1-butene, 1-pentene, 1-hexene, 2-methyl-1-propene, 3-methyl-1-pentene, 4-methyl-1-pentene, 5-methyl-1-hexene and mixtures thereof. Most typically, the thermoplastic vulcanizates of the invention will utilize isotactic polypropylene as the polyolefin component.

The thermoplastic vulcanizates of the invention are preferably prepared by dynamic vulcanization, wherein a mixture of the noncrosslinked substantially random interpolymer is mixed with the polyolefin resin and an appropriate curing agent to form a blend, which is then masticated at vulcanization temperature. In particular, the noncrosslinked substantially random interpolymer is blended with a polyolefin at a temperature above the melting point of the polyolefin. After the substantially random interpolymer and polyolefin are intimately mixed, an appropriate curing agent is added, such as are described above with respect to the compounding and curing of the substantially random interpolymers. The blend is subsequently masticated using conventional masticating equipment, such as a Banbury mixer, Brabender mixer, or a mixing extruder. The temperature of the blend during mastication is that sufficient to effect vulcanization of the substantially random interpolymer. A suitable range of vulcanization temperatures is from the melting temperature of the polyolefin resin ( 120° C. in the case of polyethylene and 175° C. in the case of polypropylene) to the temperature at which the substantially random interpolymer, the polyolefin, or the curing agent degrades. Typical temperatures are from 180° C. to 250° C., preferably from 180° C. to 200° C.

Methods other than the dynamic vulcanization of the substantially random interpolymer/polyolefin are likewise suitable. For instance, the substantially random interpolymer may be crosslinked prior to introduction to the polyolefin. The crosslinked substantially random interpolymer may then be powdered and mixed with the polyolefin at a temperature above the melting or softening point of the polyolefin. Provided that the crosslinked substantially random interpolymer particles are small, well-dispersed, and in an appropriate concentration, (that is, provided an intimate mixture of the crosslinked substantially random interpolymer and polyolefin is achieved), the thermoplastic vulcanizates of the invention may be readily obtained. Should such an intimate mixture not be achieved, the resultant product will contain visually observable islands of the crosslinked substantially random interpolymer. In this case, the part may be comminuted by pulverizing or by cold milling to reduce particle size to below 50 microns. Upon adequate comminution, the particles may be remolded into a part exhibiting more uniform composition and the enhanced properties characteristic of the thermoplastic vulcanizates of the invention.

The thermoplastic vulcanizates of the invention may include various additives, such as carbon black, silica, titanium dioxide, colored pigments, clay, zinc oxide, stearic acid, accelerators, vulcanizing agents, sulfur, stabilizers, antidegradants, processing aids, adhesives, tackifiers, plasticizers, wax, prevulcanization inhibitors, discontinuous fibers (such as wood cellulose fibers) and extender oils. Such additives may be provided either prior to, during, or subsequent to vulcanization.

Preparation of Foams

The foam structure of the present invention may take any physical configuration known in the art, such as sheet, plank,injection molded articles, or bun stock. Other useful forms are expandable or foamable particles, moldable foam particles, or beads, and articles formed by expansion and/or coalescing and welding of those particles.

Excellent teachings to processes for making ethylenic polymer foam structures and processing them are seen in C. P. Park, "Polyolefin Foam", Chapter 9, *Handbook of Polymer Foams and Technology*, edited by D. Klempner and K. C. Frisch, Hanser Publishers, Munich, Vienna, New York, Barcelona (1991), which is incorporated herein by reference.

The present foam structure may be prepared by blending and heating a polymer material comprising at least one substantially random interpolymer and a decomposable chemical blowing agent to form a foamable plasticized or melt polymer material, extruding the foamable melt polymer material through a die, inducing cross-linking in the melt polymer material, and exposing the melt polymer material to an elevated temperature to release the blowing agent to form the foam structure. The polymer material and the chemical blowing agent may be mixed and melt blended by any means known in the art such as with an extruder, mixer, or blender. The chemical blowing agent is preferably dry-blended with the polymer material prior to heating the polymer material to a melt form, but may also be added when the polymer material is in melt phase. Cross-linking may be induced by addition of a cross-linking agent or by radiation. Induction of cross-linking and exposure to an elevated temperature to effect foaming or expansion may occur simultaneously or sequentially. If a cross-linking agent is used, it is incorporated into the polymer material in the same manner as the chemical blowing agent. Further, if a cross-linking agent is used, the foamable melt polymer material is heated or exposed to a temperature of preferably less than 150° C. to prevent decomposition of the cross-linking agent or the blowing agent and to prevent premature cross-linking. If radiation cross-linking is used, the foamable melt polymer material is heated or exposed to a temperature of preferably less than 160° C. to prevent decomposition of the blowing agent. The foamable melt polymer material is extruded or conveyed through a die of desired shape to form a foamable structure. The foamable structure is then cross-linked and expanded at an elevated or high temperature (typically, 150° C.–250° C.) such as in an oven to form a foam structure. If radiation cross-linking is used, the foamable structure is irradiated to cross-link the polymer material, which is then expanded at the elevated temperature as described above. The present structure can advantageously be made in sheet or thin plank form according to the above process using either cross-linking agents or radiation.

The present foam structure may also be made into a continuous plank structure by an extrusion process utilizing a long-land die as described in GB 2,145,961A. In that process, the polymer, decomposable blowing agent and cross-linking agent are mixed in an extruder, heating the mixture to let the polymer cross-link and the blowing agent to decompose in a long-land die; and shaping and conducting away from the foam structure through the die with the foam structure and the die contact lubricated by a proper lubrication material.

The present foam structure may also be formed into cross-linked foam beads suitable for molding into articles.

To make the foam beads, discrete resin particles such as granulated resin pellets are: suspended in a liquid medium in which they are substantially insoluble such as water; impregnated with a cross-linking agent and a blowing agent at an elevated pressure and temperature in an autoclave or other pressure vessel; and rapidly discharged into the atmosphere or a region of reduced pressure to expand to form the foam beads. A version is that the polymer beads is impregnated with blowing agent, cooled down, discharged from the vessel, and then expanded by heating or with steam. Blowing agent may be impregnated into the resin pellets while in suspension or, alternately, in non-hydrous state. The expandable beads are then expanded by heating with steam and molded by the conventional molding method for the expandable polystyrene foam beads.

The foam beads may then be molded by any means known in the art, such as charging the foam beads to the mold, compressing the mold to compress the beads, and heating the beads such as with steam to effect coalescing and welding of the beads to form the article. Optionally, the beads may be pre-heated with air or other blowing agent prior to charging to the mold. Excellent teachings of the above processes and molding methods are seen in C. P. Park, above publication, pp. 227–233, U.S. Pat. No. 3,886,100, U.S. Pat. No. 3,959,189, U.S. Pat. No. 4,168,353, and U.S. Pat. No. 4,429,059. The foam beads can also be prepared by preparing a mixture of polymer, cross-linking agent, and decomposable mixtures in a suitable mixing device or extruder and form the mixture into pellets, and heat the pellets to cross-link and expand.

In another process for making cross-linked foam beads suitable for molding into articles, the substantially random interpolymer material is melted and mixed with a physical blowing agent in a conventional foam extrusion apparatus to form an essentially continuous foam strand. The foam strand is granulated or pelletized to form foam beads. The foam beads are then cross-linked by radiation. The cross-linked foam beads may then be coalesced and molded to form various articles as described above for the other foam bead process. Additional teachings to this process are seen in U.S. Pat. No. 3,616,365 and C. P. Park, above publication, pp. 224–228.

The present foam structure may be made in bun stock form by two different processes. One process involves the use of a cross-linking agent and the other uses radiation.

The present foam structure may be made in bun stock form by mixing the substantially random interpolymer material, a cross-linking agent, and a chemical blowing agent to form a slab, heating the mixture in a mold so the cross-linking agent can cross-link the polymer material and the blowing agent can decompose, and expanding by release of pressure in the mold. Optionally, the bun stock formed upon release of pressure may be re-heated to effect further expansion.

Cross-linked polymer sheet may be made by either irradiating polymer sheet with high energy beam or by heating a polymer sheet containing chemical cross-linking agent. The cross-linked polymer sheet is cut into the desired shapes and impregnated with nitrogen in a higher pressure at a temperature above the softening point of the polymer; releasing the pressure effects nucleation of bubbles and some expansion in the sheet. The sheet is re-heated at a lower pressure above the softening point, and the pressure is then released to allow foam expansion.

Blowing agents and foaming agents as employed herein is interchangeable and have the same meaning.

Blowing agents useful in making the present foam structure include decomposable chemical blowing agents. Such chemical blowing agents decompose at elevated temperatures to form gases or vapors to blow the polymer into foam form. The agent preferably takes a solid form so it may be easily dry-blended with the polymer material. Chemical blowing agents include azodicarbonamide, azodiisobutyronitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, N,N'-dinitrosopentamethylenetetramine, 4,4-oxybis (benzenesulfonylhydrazide), and trihydrazino triazine. Azodicarbonamide is preferred. Additional teachings to chemical blowing agents are seen in C. P. Park, above publication, pp. 205–208, and F. A. Shutov, "Polyolefin Foam", *Handbook of Polymer Foams and Technology*, pp. 382–402, D. Klemper and K. C. Frisch, Hanser Publishers, Munich, Vienna, New York, Barcelona (1991).

The chemical blowing agent is blended with the polymer material in an amount sufficient to evolve 0.2 to 5.0, preferably from 0.5 to 3.0, and most preferably from 1.0 to 2.50 moles of gas or vapor per kilogram of polymer.

In some processes for making the present structure, a physical blowing agent may be used. Physical blowing agents include organic and inorganic agents. Suitable inorganic blowing agents include carbon dioxide, nitrogen, argon, water, air, nitrogen, and helium. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, and neopentane. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetraflouroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane.

The amount of blowing agent incorporated into the polymer melt material to make a foam-forming polymer gel is from 0.2 to 5.0, preferably from 0.5 to 3.0, and most preferably from 1.0 to 2.50 moles per kilogram of polymer.

Various additives may be incorporated in the present foam structure such as stability control agents, nucleating agents, inorganic fillers, pigments, antioxidants, acid scavengers, ultraviolet absorbers, flame retardants, processing aids, extrusion aids, and the like.

A stability control agent may be added to the present foam to enhance dimensional stability. Preferred agents include amides and esters of $C_{10-24}$ fatty acids. Such agents are seen in U. S. Pat. Nos. 3,644,230 and 4,214,054, which are incorporated herein by reference. Most preferred agents include stearyl stearamide, glycerol monostearate, glycerol monobehenate, and sorbitol monostearate. Typically, such stability control agents are employed in an amount ranging from 0.1 to 10 parts per hundred parts of the polymer.

In addition, a nucleating agent may be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from 0.01 to 5 parts by weight per hundred parts by weight of a polymer resin.

The foam structure has density of less than 250, more preferably less than 100 and most preferably from 10 to 70 kilograms per cubic meter. The foam has an average cell size of from 0.05 to 5.0, more preferably from 0.2 to 2.0, and most preferably 0.3 to 1.8 millimeters according to ASTM D3576.

The foam structure may take any physical configuration known in the art, such as extruded sheet, rod, plank, and profiles. The foam structure may also be formed by molding of expandable beads into any of the foregoing configurations or any other configuration.

The foam structure may be closed-celled or open-celled according to ASTM D2856-A.

In one embodiment of the invention, the compositions of the invention will be utilized in cable insulation and/or cable jacketing. The cable insulation of this invention can be filled or unfilled. If filled, then the amount of filler present should not exceed an amount that would cause degradation of the electrical and/or mechanical properties of the interpolymers. Typically, the amount of filler present is between 20 and 80, preferably between 50 and 70, weight percent (wt percent) based on the weight of the polymer. Representative fillers include kaolin clay, magnesium hydroxide, silica, calcium carbonate. In a preferred embodiment of this invention in which a filler is present, the filler is coated with a material that will prevent or retard any tendency that the filler might otherwise have to interfere with the cure reactions. Stearic acid is illustrative of such a filler coating. Other additives can be used in the preparation of and be present in the insulation of this invention, and include antioxidants, processing aids, pigments and lubricants.

In another embodiment of this invention, the compositions of the invention, particularly the silane-grafted substantially random interpolymers, are shaped into automotive weatherstripping, gaskets or seals. This weatherstripping is useful as a sealing system for doors, trunks, belt lines, hoods, and similar items. These materials can be processed on conventional thermoplastic equipment. The articles made from crosslinked interpolymers should have better sound insulation than conventional sulfur-cured EPDM weatherstripping.

In yet another embodiment of this invention, crosslinkable fibers may be prepared. In one specific embodiment, a substantially random interpolymer is provided with an effective amount of a peroxide or an azide compound, as described herein. The resultant mixture is extruded into fibers, which are then heated to cause crosslinking.

In another specific embodiment, the substantially random interpolymer is extruded into fibers, which are then crosslinked by irradiation with an effective amount of radiation, such as is described herein.

In another specific embodiment, silane-grafted substantially random interpolymers are shaped into fibers, which exhibit improved heat resistance. These fibers are readily crosslinked upon exposure to moisture which can be affected by immersion in water or by exposure to atmospheric moisture.

The resultant crosslinked fibers are usefully employed in woven and non-woven fabric (e.g. washable clothing), elastic string (e.g. woven elastic strap), elastic filters for air/water filtration (e.g. non-woven air cleaners), and fiber mats (e.g. non-woven carpet underlayment).

As in the case of the thermoset elastomers of the invention, carbon black will preferably be added to the blend of the substantially random interpolymer and polyolefin prior to vulcanization. Carbon black will typically be provided in an amount from 0 to 50 weight percent, typically from 0.5 to 50 weight percent, based on the total formulation weight. When the carbon black is employed to mask a color, it is typically employed in the range of 0.5 to 10 weight percent, based on the total weight of the formulation. When the carbon black is employed to increase toughness and/or decrease cost, it is typically employed in amounts greater than 10 weight percent, based on the total weight of the formulation.

Moreover, as in the case of the thermoset elastomers of the invention, one or more extender oils will preferably be added to the blend of the substantially random interpolymer and polyolefin prior to vulcanization. Suitable extender oils are listed in Rubber World Blue Book 1975 Edition, Materials and Compounding Ingredients for Rubber, pages 145–190. Typical classes of extender oils include aromatic, naphthenic, and paraffinic extender oils. The extender oil(s) will typically be provided in an amount from 0 to 50 weight percent based on the total formulation weight. When employed, the extender oil will typically be provided in an amount of at least 5 weight percent, more typically in an amount of from 15 to 25 weight percent, based on the total weight of the formulation.

Additives such as antioxidants (e.g., hindered phenols such as, for example, Irganox® 1010), phosphites (e.g., Irgafos® 168)) U. V. stabilizers, cling additives (e.g., polyisobutylene), antiblock additives, colorants, pigments, fillers, and the like can also be included in the interpolymers employed in the blends of and/or employed in the present invention, to the extent that they do not interfere with the enhanced properties discovered by Applicants.

The additives are employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amounts of antioxidants is usually in the range of from 0.01 to 10, preferably from 0.05 to 5, more preferably from 0.1 to 2 percent by weight based upon the weight of the polymer or polymer blend. Similarly, the amounts of any of the other enumerated additives are the functionally equivalent amounts such as the amount to render the polymer or polymer blend antiblocking, to produce the desired amount of filler loading to produce the desired result, to provide the desired color from the colorant or pigment. Such additives can suitably be employed in the range of from 0.05 to 50, preferably from 0.1 to 35, more preferably from 0.2 to 20 percent by weight based upon the weight of the polymer or polymer blend. However, in the instance of fillers, they could be employed in amounts up to 90 percent by weight based on the weight of the polymer or polymer blend.

In one preferred embodiment, the thermoplastic vulcanizates of the invention will comprise from 30 to 60 weight percent of the substantially random interpolymer, from 15 to 55 weight percent of the thermoplastic polyolefin, and from 15 to 30 weight percent of the extender oil. Such thermoplastic vulcanizates are particularly useful as moldings for automotive applications.

In a particularly preferred embodiment, the thermoplastic vulcanizates of the invention are characterized by an ASTM #2 oil swell of less than 60 percent, as is determined by ASTM D-471.

Test Procedures

Monomer contents are determined by carbon-13 NMR spectroscopy.

Stress-strain properties are determined on an Instron model 1122 load frame using 0.870 inch (2.2 cm) microtensile samples measured at an extension rate of 5 inch/min (12.7 cm/min). Tensile break, elongation at break, and 100 percent modulus are measured in accordance with ASTM D-412.

Melt index is measured in accordance with ASTM D-1238.

Molecular weight and molecular weight distribution are determined by gel permeation chromatography.

ASTM #2 and #3 oil swells are measured in accordance with ASTM D-47 1.

Hardness shore "A" is measured in accordance with ASTM D-2240.

Compression set is measured in accordance with ASTM D-395.

Percent gel content (% crosslinking) is measured in accordance with ASTM D-2765-84, using a xylene extraction method. Approximately 1 gram of sample is weighed out and was transferred to a mesh basket which is then placed in boiling xylene for 12 hours. After 12 hours, the sample baskets are removed and placed in a vacuum oven at 150 C. and 28 in. of Hg vacuum for 12 hours. After 12 hours, the samples are removed, allowed to cool to room temperature over a 1 hour period, and then weighed. The percent polymer extracted is calculated as:

Percent polymer extracted=((initial weight−final weight)/initial weight)×100 The reported value, percent gel, is calculated as:

Percent Gel=100−percent extracted polymer

The upper service temperature is determined using a Perkin Elmer model TMA 7 thermo-mechanical analyzer (TMA). Probe force of 102 g and heating rate of 5° C./min were used. Test specimen was a disk with thickness of about 2 mm in diameter, prepared by melting pressing at 205° C. and air-cooling to room temperature.

EXAMPLE 1

Preparation of Ethylene-Styrene Interpolymers and Thermoset Elastomers

Ethylene/styrene copolymers were made using (tert-butylamido)dimethyl(tetramethyl-$\eta^5$-cyclopenta-dienyl) silane dimethyltitanium(+4) catalyst and tris (pentafluorophenyl)borane cocatalyst in a one to one ratio according to the following procedure. A two liter reactor was charged with 360 grams (500 mL) of ISOPAR™ E mixed alkane solvent (available from Exxon Chemicals Inc.) and the desired amount of styrene comonomer. Hydrogen was added to the reactor by differential pressure expansion from a 75 mL addition tank. The reactor was heated to the run temperature and was saturated with ethylene at the desired pressure. (Tert-butylamido)dimethyl -(tetramethyl-$\eta^5$-cyclopentadienyl)silane dimethyltitanium (IV) catalyst and tris(pentafluorophenyl)borane cocatalyst were mixed in a dry box by pipeting the desired amount of a 0.005 M solution of the tris(pentafluorophenyl)borane cocatalyst in ISOPAR™ E mixed alkane solvent or toluene into a solution of the (tert-butylamido) dimethyl-(tetramethyl-$\eta^5$-cyclopentadienyl)silane dimethyl-titanium (IV) catalyst in ISOPAR™ E mixed alkane solvent or toluene. The resulting catalyst solution was transferred to a catalyst addition tank and was injected into the reactor.

The polymerization was allowed to proceed, with ethylene being introduced on demand. Additional charges of catalyst and cocatalyst, if used, were prepared in the same manner and were added to the reactor periodically. The total amount of catalyst employed was set forth in Table One. In each instance, the amount of tris(pentafluorophenyl)borane cocatalyst (on a molar basis) equals the amount of (tert-butylamido) dimethyl-(tetramethyl-$\eta^5$-cyclopentadienyl) silane dimethyltitanium (IV) catalyst indicated in Table One. After the run time, the polymer solution was removed from the reactor and quenched with isopropyl alcohol. A hindered phenol antioxidant (IRGANOX™ 1010 (available from Ciba Geigy Corp.) was added to the polymer. Volatiles were removed from the polymer in a reduced pressure vacuum oven at 135° C. for 20 hours.

The preparation conditions for the substantially random interpolymers are set forth in Table 1.

TABLE 1

| Sample | Catalyst amount ($\mu$-mol) | ISOPAR ™-E (mL) | Styrene (mL) | Ethylene (psig) | Hydrogen ($\Delta$psi) | Reaction Temp (°C.) | Reaction Time (min) | Yield (g) |
|---|---|---|---|---|---|---|---|---|
| ES-1 | 2.5 | 250 | 750 | 300 | 0 | 80 | 10 | 32.3 |
| ES-2 | 3.8 | 500 | 500 | 200 | 0 | 80 | 10 | 28.8 |
| ES-3 | 15.0 | 500 | 500 | 200 | 100 | 60 | 30 | 166 |

The resultant substantially random interpolymers were characterized as being pseudorandom and linear.

The interpolymers were compounded and cured according to the following procedure. The 60 gram bowl of a Brabender PS-2 internal mixer was preheated to 120° F. 100 pph carbon black N550 (available from Cabot Corporation), 50 pph SUNPAR™ 2280 oil (available from Sun Oil), 5 pph paraffin wax, 1 pph stearic acid, 8 pph Vul-Cup 40KE peroxide (available from Hercules) and 1.5 pph triallyl cyanurate coagent (available from American Cyanamid) were premixed in a plastic or paper container. The resultant blend was loaded into the 60 gram bowl. To the bowl was further added 100 pph of the desired substantially random interpolymer as prepared above. The ram was lowered on the internal mixer, and the compound was allowed to mix until a temperature of 220° F. was reached (approximately five minutes). The compound was removed from the mixer and was optionally roll-milled.

The samples were compression molded at 260° F. to obtain uncured (green) test plaques. The uncured (green) test plaques were compression mold cured at 340° F. for 20 minutes to obtain crosslinked thermoset elastomer compositions.

The stress-strain properties of the neat interpolymers, of the uncured (green) test plaques, and of the crosslinked thermoset elastomer compositions are set forth in Table 2. Therein, the designation "ND" means that the given property was not determined.

TABLE 2

|  | ES-1 | ES-2 | ES-3 | C1* (Tafmer 680-P)[1] | C2 (V-457)[2] | C3 (V-707)[3] |
|---|---|---|---|---|---|---|
| COMONOMER CONTENT (AS DIRECTED BY NMR) | | | | | | |
| wt % ethylene | 67.5 | 56.8 | 48.0 |  | 51.0 | 70.0 |
| wt % styrene | 32.5 | 43.2 | 52.0 |  | 0 | 0 |
| wt % propylene | 0 | 0 | 0 |  | 49.0 | 30.0 |
| STRESS-STRAIN PROPERTIES OF NEAT UNCROSSLINKED POLYMERS | | | | | | |
| tensile at break (psi) | 3200 | 2156 | 1390 | 668 | 243 | 887 |
| 100% modulus (psi) | 759 | 445 | 256 | 170 | 75 | 205 |
| elongation at break (%) | 395 | 420 | 518 | 1115 | 1780 | 1336 |
| melt index at 190° C. (g/10 min) | 0.8 | 0.8 | 10.2 | 4.0 | 7.1 | 3.9 |
| Mw/Mn | 2.07 | 2.14 | 3.50 | 21.8 | 3.07 | 4.59 |
| GREEN STRESS-STRAIN PROPERTIES | | | | | | |
| tensile at break (psi) | ND | ND | 594 | 460 | 70 | 459 |
| 100% modulus (psi) | ND | ND | 315 | 264 | 52 | 231 |
| elongation at break (%) | ND | ND | 453 | 476 | 84 | 685 |
| STRESS-STRAIN PROPERTIES OF CROSSLINKED INTERPOLYMERS | | | | | | |
| tensile at break (psi) | 3156 | ND | 1005 | 1994 | 1236 | 1569 |
| 100% modulus (psi) | 1076 | ND | 532 | 506 | 276 | 674 |
| elongation at break (%) | 300 | ND | 297 | 383 | 409 | 292 |

*Not an example of the present invention.

As illustrated in Table 2, the crosslinked thermoset elastomer compositions of the invention exhibit a higher 100% modulus than the comparative materials C1 (Tafmer™ 680-P (available from Mitsui Petrochemical)) and C2 (Vistalon™ 457 (available from Exxon Chemical Co.)). This was consistent with the significantly higher 100% modulus exhibited by the neat interpolymers as compared to the comparative materials.

EXAMPLE 2
Preparation of Ethylene/Styrene/Ethylidene Norbornene Interpolymers and Thermoset Elastomers Ethylene/styrene/ethylidene norbornene interpolymers were made using (tert-butylamido) dimethyl(tetramethyl-$\eta^5$-cyclopenta-dienyl)silane dimethyltitanium(+4) catalyst and tris(pentafluorophenyl)borane cocatalyst in a one to one ratio according to the following procedure. A two liter reactor was charged with 360 grams (500 mL) of ISOPAR™ E mixed alkane solvent (available from Exxon Chemicals Inc.) and the desired amount of styrene comonomer. Ethylidene norbornene was transferred to the reactor. Hydrogen was added to the reactor by differential pressure expansion from a 75 mL addition tank. The reactor was heated to the run temperature and was saturated with ethylene at the desired pressure. (Tert-butylamido)dimethyl-(tetramethyl-$\eta^5$-cyclopentadienyl) silane dimethyltitanium (IV) catalyst and tris(pentafluoro-phenyl)borane cocatalyst were mixed in a dry box by pipeting the desired amount of a 0.005 M solution of the tris(pentafluorophenyl)borane cocatalyst in ISOPAR™ E mixed alkane solvent or toluene into a solution of the (tert-butylamido)dimethyl-(tetramethyl-$\eta^5$-cyclopentadienyl) silane dimethyl-titanium (IV) catalyst in ISOPAR™ E mixed alkane solvent or toluene. The resulting catalyst solution was transferred to a catalyst addition tank and was injected into the reactor.

The polymerization was allowed to proceed, with ethylene being introduced on demand. Additional charges of catalyst and cocatalyst, if used, were prepared in the same manner and were added to the reactor periodically. The total amount of catalyst employed was reported in Table Three. In each instance, the amount of tris(pentafluoro-phenyl)borane cocatalyst (on a molar basis) was equal to that of the (tert-butylamido)dimethyl-(tetramethyl-$\eta^5$-cyclopentadienyl)silane dimethyltitanium (IV) catalyst as indicated in Table Three. After the run time, the polymer solution was removed from the reactor and quenched with isopropyl alcohol. A hindered phenol antioxidant (IRGANOX™ 1010 (available from Ciba Geigy Corp.) was added to the polymer. Volatiles were removed from the polymer in a reduced pressure vacuum oven at 135° C. for 20 hours.

The preparation conditions for the ethylene/styrene/ethylidene norbornene interpolymers are set forth in Table 3.

TABLE 3

| Sample | Catalyst amount (-mol) | ISOPAR-E (mL) | Styrene (mL) | ENB amount (mL) | Ethylene pressure (psig) | Hydrogen (psi) | Reaction Temp (C) | Reaction Time (min) | Yield (g) |
|---|---|---|---|---|---|---|---|---|---|
| ES-1 | 15 | 500 | 500 | 50 | 250 | 100 | 65 | 20 | 149.9 |
| ES-2 | 12.5 | 500 | 500 | 75 | 300 | 100 | 65 | 30 | 120.7 |
| ES-3 | 10 | 500 | 500 | 25 | 200 | 100 | 65 | 30 | 135.1 |

The resultant substantially random interpolymers were characterized as being pseudorandom and linear.

The interpolymers were compounded and cured according to the following procedure. The 60 gram bowl of a Brabender PS-2 internal mixer was preheated to 120° F. 100 pph carbon black N550 (available from Cabot), 50 pph SUNPAR™ 2280 oil (available from Sun Oil), 5 pph paraffin wax, 1 pph stearic acid, 5 pph zinc oxide, 1.5 pph sulfur, and 0.5 pph Captax 2-mercaptobenzothiazole (available from R. T. Vanderbilt) were premixed in a plastic or paper container. The resultant blend was loaded into the 60 gram bowl. To the bowl was further added 100 pph of the desired interpolymer as prepared above. The ram was lowered on the internal mixer, and the compound was allowed to mix until a temperature of 220° F. was reached (approximately five minutes). The compound was removed from the mixer and was optionally roll-milled.

The samples were compression molded at 260° F. to obtain uncured (green) test plaques. The uncured (green) test plaques were compression mold cured at 340° F. for 20 minutes to obtain crosslinked thermoset elastomer compositions.

As between ESDM1(a)–(d), ESDM1(a) was prepared in accordance with the above formulation. ESDM1(b)–(d) were likewise prepared in accordance with the above formulation, except that in the case of ESDM1(b), 50 pph SUNDEX 750T oil (available from Sun Oil), was used in place of the SUNPAR oil; in the case of ESDM1(c), 50 pph trioctyltrimelliate was used in place of the SUNPAR oil; and in the case of ESDM1 (d), 0.75 pph (rather than 1.5 pph) sulfur was employed.

Regarding the comparative materials, C4 was prepared using the formulation provided above, with Vistalon 6505 EPDM (available from Exxon) being used in place of the substantially random interpolymer. C5 was prepared using the formulation provided above, with EPSyn 70A EPDM (available from DSM Copolymer) being used in place of the substantially random interpolymer used in the present invention. C6(a) was prepared using the formulation provided above, with SBR 1500 styrene butadiene rubber being used in place of the substantially random interpolymers and Sundex 750T oil (available from Sun Oil) being used in place of the SUNPAR oil. C6(b) was prepared using the formulation provided above, except that SBR 1500 styrene butadiene rubber was used in place of the substantially random interpolymer, 50 pph (rather than 100 pph) N550 carbon black was employed, 7 pph Sundex 750T oil (rather than 50 pph SUNPAR 2280 oil) was employed.

The stress-strain properties of the neat interpolymers, of the uncured (green) test plaques, and of the crosslinked thermoset elastomer compositions were set forth in Table Four. Therein, the abbreviation "ND" means that a given property was not determined.

TABLE 4

| | ESDM-1 | | | | ESDM-2 | ESDM-3 | C4 | C5 | C6 |
|---|---|---|---|---|---|---|---|---|---|
| COMONOMER CONTENT AS DETERMINED BY (C-NMR) | | | | | | | | | |
| wt % ethyene | 50.9 | | | | 46.7 | 49.4 | 50 | 50 | 0 |
| wt % styrene | 35.3 | | | | 43.7 | 44 | 0 | 0 | 24 |
| wt % diene | 13.8 | | | | 9.6 | 6.6 | 12 | 10 | 0 |
| wt % propylene | 0 | | | | 0 | 0 | 38 | 40 | 0 |
| wt % butadiene | 0 | | | | 0 | 0 | 0 | 0 | 76 |
| STRESS-STRAIN PROPERTIES OF NEAT UNCROSSLINKED INTERPOLYMERS | | | | | | | | | |
| tensile at break (psi) | 1884 | | | | 1345 | 1021 | 83 | 80 | 31 |
| 100% modulus (psi) | 319 | | | | 212 | 242 | 81 | 75 | 30 |
| elongation at break (%) | 513 | | | | 566 | 505 | 288 | 300 | >400 |
| melt index (g/10 min) | 1.6 | | | | 8.0 | 4.6 | <2.0 | <0.5 | ND |
| GREEN STRESS-STRAIN PROPERTIES | | | | | | | | | |
| | a | b | c | d | ND | ND | ND | ND | a | b |
| tensile at break (psi) | 869 | 723 | 859 | 932 | ND | ND | 78 | 80 | 3 | 61 |
| 100% modulus (psi) | 570 | 457 | 606 | 469 | ND | ND | 32 | 67 | 14 | 51 |
| elongation at break (%) | 338 | 395 | 276 | 369 | ND | ND | 250 | 130 | 2129 | 300 |
| STRESS-STRAIN AND OIL RESISTANCE PROPERTIES COMPOUNDED CROSS-LINKED INTERPOLYMERS | | | | | | | | | | |
| tensile at break (%) | 2379 | 2279 | 2451 | 2033 | ND | ND | 2044 | 2399 | 1575 | 1475 |
| 100% modulus | 1455 | 1395 | 1539 | 1018 | ND | ND | 598 | 533 | 295 | 386 |
| elongation at break (%) | 188 | 219 | 183 | 246 | ND | ND | 318 | 401 | 277 | 392 |
| ASTM #2 oil swell (70 hours @ 212° F.) | 54 | 55 | 54 | 62 | ND | ND | 93 | 100 | 57 | 49 |
| | ESDM-1 | | | | ESDM-2 | ESDM-3 | C4* | C5* | C6* |
| STRESS STRAIN PROPERTIES AFTER AN OVEN AGING FOR 70 HOURS AT 250° F. | | | | | | | | | |
| | a | b | c | d | | | | | a | b |
| tensile at break (psi) | 2697 | 2907 | ND | 2507 | ND | ND | ND | ND | 663 | 1352 |
| 100% modulus (psi) | 2143 | ND | ND | 1401 | ND | ND | ND | ND | ND | 1326 |
| elongation at | 34 | 84 | ND | 199.6 | ND | ND | ND | ND | 93 | 103 |

TABLE 4-continued

|  | ESDM-1 | ESDM-2 | ESDM-3 | C4 | C5 | C6 |
|---|---|---|---|---|---|---|
| break (%) | | | | | | |
| PERCENT CHANGE IN STRESS-STRAIN PROPERTIES AFTER OVEN AGING 70 HOURS AT 250° F. | | | | | | |
| tensile at break (%) | +15 +28 | ND +24 | ND ND | ND ND | -58 | -8 |
| 100% modulus % | -47 ND | ND +38 | ND ND | ND ND | ND | +378 |
| elongation at break (%) | -29 -62 | ND -19 | ND ND | ND ND | -76 | -74 |

*Not an example of the present invention

As illustrated in Table 4, the crosslinked thermoset elastomers of the invention typically exhibit a highly improved 100% modulus, as compared to comparative materials C4 (Vistalon™ 6505 EPDM (available from Exxon)), C5 (EPSyn 70A EPDM (available from DSM Copolymer)) and C6 (SBR 1500 styrene-butadiene rubber).

As further illustrated in Table Four, the crosslinked thermoset elastomers of the invention typically exhibit a resistance to oil swell similar to that of styrene-butadiene-rubber, but superior to that of EPDM materials.

As further illustrated in Table Four, the crosslinked thermoset elastomers of the invention exhibit aging properties superior to those of styrene-butadiene rubber. For instance, upon aging at 250° F. for 70 hours in an air oven, the crosslinked ethylene/styrene/ethylidene norbornene interpolymer exhibited increased tensile at break values and moderately decreased elongation at break values. In contrast, upon oven aging under the same conditions, the styrene-butadiene rubbers exhibited decreased tensile at break values and significantly decreased elongation at break values.

Thus, as illustrated in Table 4, the crosslinked ethylene/styrene/diene thermoset elastomers of the invention exhibit a resistance to oil swell characteristic of styrene-butadiene rubber without suffering the concomitant negative effects of heat aging.

EXAMPLE 3
Preparation of Thermoplastic Vulcanizates

The Brabender PS-2 or Haake internal torque mixer was preheated to 350° C. The desired amount of Pro-fax 6524 isotactic polypropylene (available from Himont Incorporated) was added to the mixer, and was allowed to melt and to homogenize. Over one minute, the desired amount of the noncrosslinked substantially random interpolymer was added. Thereafter, the process oil, antioxidant, stearic acid, and carbon black were added and mixed for one minute. The zinc oxide, sulfur, benzothiazyldisulfide and methyl tuads were added. Mixing occurs until the torque reaches a maximum and for at least 10 minutes total mix time. The resultant thermoplastic vulcanizate was removed from the mixer.

In executing the above procedure, the formulations set forth in Table 5 were employed. Unless otherwise indicated, all amounts were expressed in parts per hundred, based on 100 parts of the elastomer.

TABLE 5

| Elastomer | TPV-1 ESDM-2 | | TPV-2 ESDM-3 | | | C-TPV-1 C-4 | C-TPV-2 C-5 |
|---|---|---|---|---|---|---|---|
| wt % ethylene | 46.7 | | 49.4 | | | 50 | 50 |
| wt % styrene | 43.7 | | 44 | | | 0 | 0 |
| wt % diene | 9.6 | | 6.6 | | | 12 | 10 |
| wt & propylene | 0 | | 0 | | | 38 | 40 |
| TPV formulation (all amounts in pph) | | A | B | C | D | | |
| Substantially random interpolymer | 100 | 100 | 100 | 100 | 100 | 100 | 100 |
| isotactic polypropylene | 67 | 67 | 33 | 67 | 100 | 67 | 67 |
| process oil | 50 | 50 | 100 | 100 | 100 | 50 | 50 |
| IRGANOX 1010 antioxidant (available from Ciba Geigy Corp.) | 3 | 3 | 3 | 3 | 3 | 3 | 3 |
| stearic acid | 1 | 1 | 1 | 1 | 1 | 1 | 1 |
| N550 carbon black available from Cabot | 1 | 1 | 1 | 1 | 1 | 1 | 1 |
| zinc oxide | 5 | 5 | 5 | 5 | 5 | 5 | 5 |
| sulfur | 1.5 | 1.5 | 1.5 | 1.5 | 1.5 | 1.5 | 1.5 |
| benzothiazyldisulfide (available from Altax) | 0.38 | 0.38 | 0.38 | 0.38 | 0.38 | 0.38 | 0.38 |
| methyl tuads | 0.75 | 0.75 | 0.75 | 0.75 | 0.75 | 0.75 | 0.75 |

Except in the case of TPV1(b), SunPar™ 2280 (available from Sun Oil) was employed as the process oil. For TPV1(b), trioctyltrimelliate was employed as the process oil.

The resultant thermoplastic vulcanizates were compression molded at 380° F. Representative physical properties of the thermoplastic vulcanizates and of comparative thermoplastic vulcanizates C-TPV1 (made with Vistalon 6505 EPDM (available from Exxon)) and C-TPV2 (made with EPSyn 70A EPDM (available from DSM Rubber)) were set forth in Table 6. Therein, the abbreviation "ND" means that a given property was not determined.

TABLE 6

| Stress-Strain properties | TPV 1 A | TPV 1 B | TPV 2 A | TPV 2 B | TPV 2 C | TPV 2 D | C-TPV-1 | C-TPV-2 |
|---|---|---|---|---|---|---|---|---|
| tensile at break (psi) | 1507 | 1589 | 1621 | 515 | 1549 | 1436 | 1520 | 1787 |
| 100% modulus (psi) | 1375 | 1307 | 951 | 327 | 691 | 1008 | 759 | 889 |
| elongation at break (%) | 132 | 164 | 251 | 192 | 336 | 247 | 322 | 344 |
| ASTM #2-70 hours at 212° F. (% swell) | ND | ND | 109.5 | 133.8 | 89.3 | 68.2 | ND | ND |
| Hardness Shore "A" | 88 | 86 | 86 | 63 | 77 | 83 | 90 | 88 |

A comparison of TPV1(a) and TPV2(a) with comparative materials C-TPV1 (made with Vistalon 6505 EPDM (available from Exxon)) and C-TPV2 (made with EPSyn 70A EPDM (available from DSM Rubber)) indicates that the thermoplastic vulcanizates of the invention exhibit a much greater resistance to oil swell (under the ASTM #2 test method) than the comparative materials without sacrificing hardness (Hardness Shore "A"). A comparison of these materials further indicates that the thermoplastic vulcanizates of the invention exhibit improved 100% modulus values and comparable tensile at break values, with respect to the comparative materials.

A comparison of TPV-2(b), TPV-2(c), and TPV-2(d) indicates that one can adjust resistance to ASTM #2 oil swell and hardness values by adjusting the ratio between the polypropylene and the substantially random interpolymer. Namely, as the proportion of the polypropylene increases, the resistance to ASTM #2 oil swell and hardness likewise increase. Moreover, the effect of the added substantially random interpolymer was evident. In particular, the percent elongation at break of the inventive thermoplastic vulcanizates was many times greater than that of unmodified isotactic polypropylene, which exhibits a percent elongation at break of 13 percent.

EXAMPLE 4

Peroxide Modified ESI

Preparation of Polymers Used
Reactor Description

A 6 gallon (22.7 L), oil jacketed, Autoclave continuously stirred tank reactor (CSTR) was employed as the reactor. A magnetically coupled agitator with Lightning A-320 impellers provides the mixing. The reactor ran liquid fill at 475 psig (3,275 kPa). Process flow was in the bottom and out the top. A heat transfer oil was circulated through the jacket of the reactor to remove some of the heat of reaction. After the exit from the reactor was a micromotion flow meter that measured flow and solution density. All lines on the exit of the reactor were traced with 50 psi (344.7 kPa) steam and insulated.

Procedure

Ethylbenzene solvent was supplied to the mini-plant at 30 psig (207 kPa). The feed to the reactor was measured by a Micro-Motion mass flow meter. A variable speed diaphragm pump controlled the feed rate. At the discharge of the solvent pump a side stream was taken to provide flush flows for the catalyst injection line (1 lb/hr (0.45 kg/hr)) and the reactor agitator (0.75 lb/hr (0.34 kg/hr)). These flows were measured by differential pressure flow meters and controlled by manual adjustment of micro-flow needle valves. Uninhibited styrene monomer was supplied to the mini-plant at 30 psig (207 kpa). The feed to the reactor was measured by a Micro-Motion mass flow meter. A variable speed diaphragm pump controlled the feed rate. The styrene streams was mixed with the remaining solvent stream. Ethylene was supplied to the mini-plant at 600 psig (4,137 kPa). The ethylene stream was measured by a Micro-Motion mass flow meter just prior to the Research valve controlling flow. A Brooks flow meter/controllers was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to ~5° C. by an exchanger with −5° C. glycol on the jacket. This stream entered the bottom of the reactor. The three component catalyst system and its solvent flush also enter the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. These streams combine with each other and the catalyst flush solvent just prior to entry through a single injection line into the reactor.

Polymerization was stopped with the addition of catalyst kill (water mixed with solvent) into the reactor product line after the micromotion flow meter measuring the solution density. Other polymer additives can be added with the catalyst kill. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to ~250 mm of pressure absolute at the reactor pressure control valve. This flashed polymer entered a hot oil jacketed devolatilizer. Approximately 85 percent of the volatiles were removed from the polymer in the devolatilizer. The volatiles exit the top of the devolatilizer. The stream was condensed and with a glycol jacketed exchanger, entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer seperated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

| | Catalysts Employed | | | |
|---|---|---|---|---|
| | Titanium | Boron Compound | | MMAO[e] |
| | Compound Type | Type | Boron/Ti Ratio | Al/Ti Ratio |
| ESI-4 | A[a] | A[c] | 1.25:1 | 12.0:1 |
| ESI-5 | B[b] | A[c] | 1.26:1 | 8.0:1 |
| ESI-6 | B[b] | A[c] | 1.25:1 | 10.0:1 |
| ESI-7 | B[b] | A[c] | 1.25:1 | 10.0:1 |
| ESI-8 | B[b] | A[c] | 1.24:1 | 10.0:1 |
| ESI-9 | A[a] | A[c] | 1.251 | 10.01 |
| ESI-10 | B[b] | B[d] | 2.98:1 | 7.0:1 |
| ESI-11 | B[b] | B[d] | 3.011 | 7.01 |
| ESI-12 | B[b] | B[d] | 3.491 | 9.01 |
| ESI-13 | B[b] | A[c] | 1.25:1 | 10.0:1 |
| ESI-14 | A[a] | A[c] | 1.25:1 | 9.9:1 |
| ESI-15 | A[a] | A[c] | 1.24:1 | 12.0:1 |

[a](t-butylamido)dimethyl (tetramethylcyclopentadienyl) silane-titanium (II) 1,3-pentadiene.
[b]dimethyl[N-(1,1-dimethylethyl)-1,1-dimethyl-1-[(1,2,3,4,5-.eta.)-1,5,6,7-tetrahydro-3-phenyl-s-indacen-l-yl] silanaminato(2-)-N]-titanium.
[c]bis-hydrogenated tallowalkyl methylammonium tetrakis (pentafluorophenyl) borate.
[d]tris(pentafluorophenyl)borane. e a modified methylaluminoxane commercially available from Akzo Nobel as MNAO-3A.

Table 1 lists the characteristics of the polymers used in this study.

TABLE 7

| | Polymers Used | | | | |
|---|---|---|---|---|---|
| Lot No. | Description | $I_2$[a] (g/10 min) | $I_{10}/I_2$ | Total Styrene (%) | Atactic PS (%) |
| ESI-4 | 74% S ESI | 1.44 | 8.8 | 58.4 | 15.5 |
| ESI-5 | 67% S ESI | 1.10 | 9.0 | 51.2 | 15.3 |
| ESI-6 | 60% S ESI | 1.11 | 7.5 | 56.4 | 3.4 |
| ESI-7 | 54% S ESI | 1.72 | 6.6 | 52.3 | 1.5 |
| ESI-8 | 45% S ESI | 1.08 | 7.7 | 43.4 | 1.3 |
| ESI-9 | 33% S ESI | 1.22 | 7.6 | 26.4 | 6.2 |
| ESI-10 | 41 | 1.3 | — | 41.0 | 0.3 |
| ESI-11 | 51 | 1.2 | — | 50.0 | 0.6 |
| ESI-12 | 73 | 1.2 | — | 69.1 | 1.7 |
| ESI-13 | 58% S ESI | 1.0 | — | — | 3 |
| ESI-14 | 73.4% S ESI | 5.0 | — | — | 8.6 |
| ESI-15 | 68.5% S ESI | 1.05 | 9.0 | — | 16.9 |
| POE | Affinity™ [b] EG 8100* | 1 | — | — | — |

[a]As determined by ASTM D 1238 cond. I.
[b]An ethylene-octene copolymer having a melt index of 1 g/10 min. (as determined by ASTM D 1238 cond. I) and a density of 0.870 g/cc (as determined by ASTM D 792) commercially available from The Dow Chemical Company.

Formulation Processing Conditions

Formulations with above polymers were prepared with 3, 6 and 9 wt % dicumyl peroxide (DiCup manufactured by Hercules Inc.). Formulations were prepared in a Hakke Rheocord 9000 equipped with a 50 g mixing bowl at following conditions: 120° C., 50 RPM, 10–12 minutes mixing time.

Formulation Curing Conditions

Samples were crosslinked at 170° C. for 20 minutes, 200 pounds of force in a compression molding press (Tetrahedron Press Model-MTP-8).

Results

Table 8 summarizes results for gel content and upper service temperature for the peroxide crosslinked ESI samples. The results in Table 8 indicate that peroxide can be

| | Reactor Data | | | | | | | | |
|---|---|---|---|---|---|---|---|---|---|
| Polymer | Reactor Temp. °C. | Solv. Flow lb/hr | kg/hr | Ethylene Flow lb/hr | kg/hr | Hydrogen Flow SCCM | Styrene Flow lb/hr | kg/hr | Vent Conv. % |
| ESI-4 | 65.5 | 8.8 | 3.99 | 0.81 | 0.37 | 4.5 | 13.0 | 5.90 | 87.26 |
| ESI-5 | 71.4 | 11.4 | 5.17 | 1.21 | 0.55 | 9.0 | 14.0 | 6.35 | 87.79 |
| ESI-6 | 80.3 | 18.6 | 8.44 | 1.69 | 0.77 | 12.0 | 12.0 | 5.44 | 88.18 |
| ESI-7 | 86.7 | 28.9 | 13.11 | 2.48 | 1.12 | 17.0 | 9.7 | 4.40 | 92.43 |
| ESI-8 | 90.4 | 30.1 | 13.66 | 2.90 | 1.32 | 21.0 | 8.9 | 4.04 | 92.06 |
| ESI-9 | 101.9 | 19.2 | 8.72 | 1.99 | 0.90 | 4.0 | 7.0 | 3.18 | 87.72 |
| ESI-10 | 90.9 | 40.0 | 18.16 | 3.13 | 1.42 | 16.0 | 5.3 | 2.41 | 95.72 |
| ESI-11 | 89.9 | 25.6 | 11.62 | 2.06 | 0.94 | 9.0 | 4.3 | 1.95 | 96.71 |
| ESI-12 | 79.4 | 41.0 | 18.61 | 2.18 | 0.99 | 6.0 | 16.5 | 7.49 | 94.91 |
| ESI-13 | 79.7 | 18.6 | 8.44 | 1.70 | 0.77 | 11.7 | 12.0 | 5.44 | 88.6 |
| ESI-14 | 69.2 | 2.92 | 1.32 | 1.0 | 0.45 | 0 | 20.0 | 9.07 | 86.3 |
| ESI-15 | 65.0 | 8.8 | 3.99 | 0.80 | 0.36 | 4.5 | 13.0 | 5.90 | 88.7 | used to crosslink ESI. The degree of crosslinking was measured by gel content analysis. All the peroxide modified samples have gel content greater than 60%. The upper service temperature increased significantly when the samples were treated with peroxide. FIG. 1 shows the graph of expected and actual gel content vs. styrene composition for the ESI samples treated with 9% peroxide. The measured gel content is much higher than the expected value. This is unexpected results since the reactivity of ESI toward peroxide is similar to polyethylene rather than a copolymer of styrene and ethylene.

TABLE 8

Peroxide Crosslinking of Ethylene Styrene Interpolymers

| Sample No. | Polymer | Description | % Gel | Upper Service Temperature (C) |
|---|---|---|---|---|
|  | ESI-9 | 33% S ESI-0% Peroxide | 0 | 86.0 |
| B | ESI-8 | 45% S ESI-0% Peroxide | 0 | 50.0 |
| C | ESI-7 | 54% S ESI-0% Peroxide | 0 | 50.0 |
| D | ESI-6 | 60% S ESI-0% Peroxide | 0 | 50.0 |
| E | ESI-5 | 67% S ESI-0% Peroxide | 0 | 60.0 |
| F | ESI-4 | 74% S ESI-0% Peroxide | 0 | 68.0 |
| G | POE | Affinity ™ EG 8100-0% Peroxide | 0 | 68.0 |
| H | x-LINKED ESI-9 | 33% S ESI-3% Peroxide | 88.6 | >185 |
| I | x-LINKED ESI-8 | 45% S ESI-3% Peroxide | 93.0 | 165.0 |
| J | x-LINKED ESI-7 | 54% S ESI-3% Peroxide | 79.3 | >185 |
| K | x-LINKED ESI-6 | 60% S ESI-3% Peroxide | 82.2 | 179.0 |
| L | x-LINKED ESI-5 | 67% S ESI-3% Peroxide | 68.6 | 170.0 |
| M | ESI-4 | 74% S ESI-3% Peroxide | 63.5 | 97.0 |
| N* | x-LINKED POE | Affinity ™ EG 8100-3% Peroxide | 97.3 | >185 |
| O | x-LINKED ESI-9 | 33% S ESI-6% Peroxide | 94.6 | >185 |
| P | x-LINKED ESI-8 | 45% S ESI-6% Peroxide | 90.5 | >185 |
| Q | x-LINKED ESI-7 | 54% S ESI-6% Peroxide | 92.0 | >185 |
| R | x-LINKED ESI-6 | 60% S ESI-6% Peroxide | 92.6 | >185 |
| S | x-LINKED ESI-5 | 67% S ESI-6% Peroxide | 85.5 | >185 |
| T | x-LINKED ESI-4 | 74% S ESI-6% Peroxide | 75.3 | >185 |
| U* | x-LINKED POE | Affinity ™ EG 8100-6% Peroxide | 99.4 | >185 |
| V | x-LINKED ESI-9 | 33% S ESI-9% Peroxide | 94.9 | >185 |
| W | x-LINKED ESI-8 | 45% S ESI-9% Peroxide | 93.5 | >185 |
| X | x-LINKED ESI-7 | 54% S ESI-9% Peroxide | 92.6 | >185 |
| Y | x-LINKED ESI-6 | 60% S ESI-9% Peroxide | 91.5 | >185 |
| Z | x-LINKED ESI-5 | 67% S ESI-9% Peroxide | 89.0 | >185 |
| AA | x-LINKED ESI-4 | 74% S ESI-9% Peroxide | 80.7 | >185 |
| AB* | x-LINKED POE | Affinity ™ EG 8100-9% Peroxide | 97.8 | >185 |

*Not an example of the present invention.

Peroxide Modified ESI Blends

Polymers Used

Table 9 summarizes ESI samples used for this study.

TABLE 9

Polymers Used

| Polymer | Description |
|---|---|
| ESI-9 | 33% S ESI |
| ESI-4 | 74% S ESI |
| POE | Affinity ™ EG 8100 |
| SBS | Vector 2518 Styrenic Block Copolymer* |

*A styrene-butadiene-styrene block copolymer containing 30% styrene by weight having a melt index of 1 g/10 min. (as determined by ASTM D 1238 cond. I) commercially available from Dexco.

Formulation Processing Conditions

Formulations with above polymers were prepared with 4 wt % dicumyl peroxide (DiCup manufactured by Hercules Inc.). Formulations were prepared in a Haake Rheocord 9000 equipped with a 50 g mixing bowl at following conditions: 120° C., 50 RPM, 10–12 minutes mixing time.

Formulation Curing Conditions

Samples were crosslinked at 170° C. for 20 minutes, 200 pounds of force in a compression molding press (Tetrahedron Press Model-MTP-8).

Results

Table 10 summarizes the blends of ESI prepared with AFFINITY EG 81 00 and SBS to determine effect of blending a polyolefin elastomer or a styrene/butadiene/styrene on crosslinking efficiency of ESI copolymers.

TABLE 10

Blend Properties

| Sample No. | Description | Gel % |
|---|---|---|
| A | ESI-9 (33% S) | 0 |
| B | ESI-9 (33% S) + 4% DCP | 83.8 |
| C | ESI-9 (33% S) + 10% SBS + 4% DCP | 87 |
| D | ESI-9 (33% S) + 10% POE + 4% DCP | 81.1 |
| E | ESI-4 (74% S) | 0 |
| F | ESI-4 (74% S) + 4% DCP | 64.5 |
| G | ESI-4 (74% S) + 10% SBS + 4% DCP | 71.5 |
| H | ESI-4 (74% S) + 10% POE + 4% DCP | 59.6 |

* Not an example of the present invention.

Addition of SBS increased the gel level for both of the ethylene/styrene interpolymers studied.

E-Beam Radiated Substantially Random Interpolymers

The same polymers as listed in Table 7 were used for this study.

Formulation Preparation and Curing Conditions

Compression molded plaques were treated with 5, 10, 15 and 20 Mrad of e-beam radiation.

Results

The results in Table 11 indicate that E-beam radiation can be used to crosslink ESI, i.e., the radiation increases the gel content and upper service temperature. It is observed that the E-beam radiated samples (R, Q, and P) are much less sticky than the unmodified samples (C, D, and E). The effect of low radiation dose on $I_{10}/I_2$ ratio was measured for 74% S ESI sample radiated with 5 Mrad dosage: the $I_{10}/I_2$ ratio for non-treated sample was 8.8 and for 5 Mrad dosage was 12.3.

TABLE 11

E-beam Crosslinking of Ethylene Styrene Interpolymers

| Sample No. | Description | % Gel | Upper Service Temperature (C) |
|---|---|---|---|
| A | ESI-9 (33% S)-O Mrad | 0 | 86 |
| B | ESI-8 (45% S)-O Mrad | 0 | 50 |
| C | ESI-7 (54% S)-O Mrad | 0 | 50 |
| D | ESI-6 (60% S)-O Mrad | 0 | 56 |
| E | ESI-5 (67% S)-O Mrad | 0 | 60 |
| F | ESI-4 (74% S)-O Mrad | 0 | 68 |
| G | Affinity ™ EG 8100-0 Mrad | 0 | 68 |
| H | 33% S ESI-5 Mrad | 0.1 | 88 |
| I | 45% S ESI-5 Mrad | 0 | 56 |
| J | 54% S ESI-5 Mrad | 1.8 | 56 |
| K | 60% S ESI-5 Mrad | 0.3 | 60 |
| L | 67% S ESI-5 Mrad | 0.4 | 64 |
| M | 74% S ESI-5 Mrad | 0.4 | 72 |
| N* | Affinity ™ EG 8100-5 Mrad | 0.3 | 73 |
| O | ESI-9 (33% S)-10 Mrad | — | — |
| P | ESI-8 (45% S)-10 Mrad | 1.3 | 62 |
| Q | ESI-7 (54% S)-10 Mrad | 0.1 | 64 |
| R | ESI-6 (60% S)-10 Mrad | 0.4 | 68 |
| S | ESI-5 (67% S)-10 Mrad | 0.1 | 74 |
| T | ESI-4 (74% S)-10 Mrad | 0.2 | 80 |
| U* | Affinity ™ 8100-10 Mrad | 76.3 | 77 |
| V | ESI-9 (33% S)-15 Mrad | 62.2 | 98 |
| W | ESI-8 (45% S)-15 Mrad | 68 | 80 |
| X | ESI-7 (54% S)-15 Mrad | 65 | 72 |
| Y | ESI-6 (60% S)-15 Mrad | 44.6 | 70 |
| Z | ESI-5 (67% S)-15 Mrad | 8.2 | 74 |
| AA | ESI-4 (74% S)-15 Mrad | 1.2 | 77 |
| AB* | Affinity ™ EG 8100-15 Mrad | 82.3 | 96 |
| AC | ESI-9 (33% S)-20 Mrad | 70 | 125 |
| AD | ESI-8 (45% S)-20 Mrad | 70.4 | 94 |
| AE | ESI-7 (54% S)-20 Mrad | 75.2 | 92 |
| AF | ESI-6 (60% S)-20 Mrad | 67.1 | 80 |
| AG | ESI-5 (67% S)-20 Mrad | 55.3 | 80 |
| AH | ESI-4 (74% S)-20 Mrad | 21.2 | 80 |
| AI* | Affinity ™ 8100-20 Mrad | 90.2 | 186 |

* Not an example of the present invention.

Silane Modified Substantially Random Interpolymers

Materials Used

Table 12 summarizes the materials used for this study.

TABLE 12

Polymers Used

| Polymer No. | Description |
|---|---|
| ESI-10 | 41% S ESI |
| ESI-11 | 51% S ESI |
| EST-12 | 73% S ESI |
| POE | Affinity ™ 8100 |

Formulation Preparation Conditions

Table 13 shows formulations prepared for the silane crosslinking study.

TABLE 13

Formulations for ESI Silane Crosslinking Study

| ESI-10 wt. % | ESI-11 wt. % | ESI-12 wt. % | 8100 wt. % | Silane wt. % | Peroxide wt. % | ate wt. % |
|---|---|---|---|---|---|---|
| 97.85 | 0 | 0 | 0 | 2 | 0.15 | 0.02 |
| 97.7 | 0 | 0 | 0 | 2 | 0.30 | 0.02 |
| 95.85 | 0 | 0 | 0 | 4 | 0.15 | 0.02 |
| 95.7 | 0 | 0 | 0 | 4 | 0.30 | 0.02 |
| 0 | 97.85 | 0 | 0 | 2 | 0.15 | 0.02 |
| 0 | 97.7 | 0 | 0 | 2 | 0.30 | 0.02 |
| 0 | 95.85 | 0 | 0 | 4 | 0.15 | 0.02 |
| 0 | 95.7 | 0 | 0 | 4 | 0.30 | 0.02 |
| 0 | 0 | 97.85 | 0 | 2 | 0.15 | 0.02 |
| 0 | 0 | 97.7 | 0 | 2 | 0.30 | 0.02 |
| 0 | 0 | 95.85 | 0 | 4 | 0.15 | 0.02 |
| 0 | 0 | 95.7 | 0 | 4 | 0.30 | 0.02 |
| 0 | 0 | 0 | 97.85 | 2 | 0.15 | 0.02 |
| 0 | 0 | 0 | 95.85 | 4 | 0.15 | 0.02 |

The Samples were extruded on a Haake Polylab Polymer Processing unit equipped with a 18 mm twin screw extruder, pelletizer and water bath with air knife. Samples were prepared in a two step process:

Step 1: Silane was grafted onto the polymer using the following procedure:

Appropriate ratio solution of vinyltrimethoxy silane and dicumyl peroxide was liquid injected into the extruder barrel along with the polymer Conditions: 200° C. melt temperature, 50 rpm Step 2: Addition of the dibutyltin dialurate catalyst A 2% concentrate of the catalyst was made in each of the polymers studied. The catalyst concentrate pellets were dry blended with silane grafted material from step 1 and extruded at 200° C. at 50 rpm.

The results in Table 14 indicates that silane chemistry can be used to prepare crosslinked ESI by moisture cured process. ESI was grafted with vinyl siloxane which act as moisture cured reactive site. The gel content in the range from 40 to 65% was achieved for the ESI with the styrene composition from 41 to 51%.

TABLE 14

Silane Crosslinking of Ethylene Styrene Interpolymers

| Sample No. | Description | % Gel | Upper Service Temperature (°C.) |
|---|---|---|---|
| A | ESI-10 (41% S), 1500 ppm DCP, 2% VTMOS | 45.6 | 55.2 |
| B | ESI-10 (41% S), 3000 ppm DCP, 2% VTMOS | 65.3 | 55.1 |
| C | ESI-10 (41% S), 1500 ppm DCP, 4% VTMOS | 57.0 | 55.1 |
| D | ESI-10 (41% S), 3000 ppm DCP, 4% VTMOS | 44.3 | 55.1 |
| E | ESI-11 (51% S), 1500 ppm DCP, 2% VTMOS | 45.8 | 47.3 |
| F | ESI-11 (51% S), 3000 ppm DCP, 2% VTMOS | 57.6 | 49.3 |
| G | ESI-11 (51% S), 1500 ppm DCP, 4% VTMOS | 64.8 | 49.5 |
| H | ESI-11 (51% S), 3000 ppm DCP, 4% VTMOS | 46.8 | 49.3 |
| I | ESI-12 (73% S), 1500 ppm DCP, 2% VTMOS | 0.4 | 59.7 |
| J | ESI-12 (73% S), 3000 ppm DCP, 2% VTMOS | 0.3 | 61.6 |
| K | ESI-12 (73% S), 1500 ppm DCP, 4% VTMOS | 0.1 | 61.4 |
| L | ESI-12 (73% S), 3000 ppm DCP, 4% VTMOS | 1.0 | 59.9 |

TABLE 14-continued

Silane Crosslinking of Ethylene Styrene Interpolymers

| Sample No. | Description | % Gel | Upper Service Temperature (°C.) |
|---|---|---|---|
| M* | Affinity ™ EG 81008100, 1500 ppm DCP, 2% VTMOS | 87.5 | 92.4 |
| N* | Affinity ™ 8100EG 8100, 1500 ppm DCP, 4% VTMOS | 93.9 | >185 |

*Not an example of the present invention.

AZIDE MODIFIED ESI

Test methods and equipment used in the preparation and testing of the following Samples 1–10.

Test Methods

A Rheometrics Inc. RDA-II dynamic mechanical spectrometer was used to obtain DMS data. A temperature sweep was run from approximately −70° C. to 300° C. at 5° C./step with 30 s equilibration delay at each step. The oscillatory frequency was 1 radian/s with an autostrain function of 0.1% strain initially, increasing in positive 100% adjustments whenever the torque decreased to 4 g-cm. The maximum strain was set at 26%. The 7.9-mm parallel plate fixtures were used with an initial gap of 1.5 mm at 160° C. (the sample was inserted into the RDA-II at 160° C.). The "Hold" function was engaged at 160° C. and the instrument was cooled to -70° C. and the test started. (The Hold function corrects for the thermal expansion or contraction as the test chamber is heated or cooled.) A nitrogen environment was maintained throughout the experiment to minimize oxidative degradation.

DSC (Differential Scanning Calorimetry) data were obtained using a Perkin-Elmer DSC-7. Samples were melt-pressed into thin films and put in aluminum pans. The samples were heated to 1 80° C. in the DSC and kept there for 4 min to ensure complete melting. The samples were then cooled at 10°C./min to −30°C. and heated to 140° C. at 10°C./min.

A Perkin Elmer model TMA 7 thermomechanical analyzer was used to measure the upper service temperature. Probe force of 102 g and heating rate of 5° C./min were used. Test specimen was a disk with thickness of about 2 mm and diameter, prepared by compression molding at 205° C. and air-cooling to room temperature.

General procedures for determining compression set are described in ASTM D 395-89. The sample plaques were cut into disks of 1.14 inch diameter. The disks were stacked up to a thickness of 0.5 inch. Test specimens were measured under constant strain of 25%, at 70° C. for 22 h. The sample was aged at 70° C. for 22 h under 25% compression, cooled to 22° C.

Xylene Extraction was performed by weighing out 1 gram samples of the polymer. The samples are transferred to a mesh basket which is then placed in boiling xylene for 12 hours. After 12 hours, the sample baskets are removed and placed in a vacuum oven at 150° C. and 28 in. of Hg vacuum for 12 hours. After 12 hours, the samples are removed, allowed to cool to room temperature over a 1 hour period, and then weighed. The results are reported as percent polymer extracted.

% extracted=(initial weight−final weight)/initial weight.

Tensile properties were determined by compression molding 1/16 inch plaques. Tensile specimens were then cut from these plaques and tested on an Instron Tensile tester.

Samples were prepared using either a HaakeBuchler Rheomix 600 mixer with roller style blades, attached to a HaakeBuchler Rheocord 9000 Torque rheometer, or using a Brabender mixer (Type R.E.E. No. A-9/S.B) with a 50 g mixing bowl.

Preparation of 4.4'-disulfonylazidophenyl ether 4.4'-bis(chlorosulfonyl)phenyl ether (10 g, 0.027 mole) was dissolved in 100 mL of acetone and 4.426 g (0.06808 moles) of solid sodium azide was added portionwise over the course of 15 minutes. The reaction mixture was stirred for 26 hours at ambient temperature and then was filtered to remove sodium chloride. The filter cake was washed with acetone and the combined filtrate evaporated to yield a white solid which was washed twice with 20 mL portions of water and then dried at ambient temperature under vacuum. The resulting white solid (7.3 g, 70%) was identified as 4,4'-disulfonylazidophenyl ether by 1H and 13C NMR spectroscopy.

Crosslinking of Ethylene-Styrene Interpolymers

Ethylene-styrene copolymer (40 g) containing 58 wt % styrene (ESI-3831-960921-1100) (3 wt % atactic polstyrene, 1.0 MI) was dry blended with 0.2 g (0.5 weight percent, 0.55 mmole) of 4,4'-disulfonylazidobiphenyl in a plastic bag. The blend was added to a Brabender mixer (Type R.E.E. No. A-9/S.B) at 120° C. (60 rpm) with a 40 g mixing bowl. The mixture was blended at 120° C. for 3 minutes and then removed from the mixer and allowed to cool yielding 38.9 g of blend 1.

The above blending experiment was repeated with 0.4 g (1.0 weight percent, 1.1 mmole) of 4, 4'-disulfonylazidobiphenyl to yield blend 2, and 0.8 g (2.0 weight percent, 2.2 mmole) of 4, 4'-disulfonylazidophenyl to yield blend 3.

The above blending experiment was repeated with 0.8 g (2 weight percent) of 1,3-disulfonylazidobenzene to yield 39.3 g of blend 4, and 0.8 g (2.0 weight percent) of 1,3,5-trisulfonylazidobenzene to yield 39.1 g of blend 5.

Blends 1–5 and uncrosslinked ESI-13 which is the untreated starting material were then compression molded at 120° C. and 20,000 lb force for 3 minutes, followed by curing at 190° C. and 20,000 lb for 10 minutes, followed by cooling to 80° C. over 5 minutes while still under pressure. All of the samples were characterized by TMA analysis and select samples were characterized by xylene extraction and DMS measurements. This data shows that at 2% sulfonyl azide, the samples are completely crosslinked. Crosslinked Blends 1–5 are referred to as Samples 1–5 respectively.

| Sample | UST (TMA) °C. | % Xylene Extract. | G' (20° C.) | G' (200° C.) |
|---|---|---|---|---|
| ESI-13 | 52 | 99 | $3.0E^{+07}$ | $3.0E^{+03}$ |
| 1 | 64 | 12 | Data Not measured | |
| 2 | 106 | 2 | Data Not measured | |
| 3 | >190 | 2 | Data Not measured | |
| 4 | >190 | 0 | $8.0E^{+06}$ | $3.0E^{+06}$ |
| 5 | >190 | 2 | Data Not measured | |

| Sample | Toughness (In-Lb/Cu. In) | Break Stress (PSI) | % Elongation | Compression set (70° C.) |
|---|---|---|---|---|
| ESI-13 | 2450 | 411 | 900 | 64% |
| 3 | 4000 | 1700 | 650 | 17% |
| 4 | 4700 | 2000 | 630 | 7% |
| 5 | 4300 | 1700 | 630 | 16% |

The following example shows crosslinking of a high styrene ESI (St wt %>50%), which is important for illustrating why crosslinking with difunctional azides is preferred over peroxide crosslinking.

Haake Rheocord 9000 equipped with a 50 g mixing bowl was heated to 120° C. 40.0 g of ESI (3831-960710-1500)

(73.4% Copolymer Styrene, 8.6% atactic polystyrene, @ added to the mixing bowl. After 1 minute, 0.8 g (2.0 weight percent) of 1,3-disulfonylazidebenzene was added to the mixing bowl and the sample was compounded for 3 more minutes. The polymer was removed from the Haake and compression molded at 120° C. and 20,000 lb force for 3 minutes. The sample was then cured at 1 80° C. and 20,000 lb for 10 minutes followed by cooling to 80° C. over 5 minutes to yield Sample 6. Untreated ESI-14 was not treated with poly(sulfonyl azide) but was molded and cured as was Sample 6.

| Sample | UST (TMA) °C. | Compression set (70° C.) |
| --- | --- | --- |
| ESI-14 | 60 | 97% |
| 6 | >190 | 15% |

The results from Samples 1–6 demonstrate that disulfonyl azide can be used to prepare coupled, partially crosslinked, and fully crosslinked ESI. Samples 2–4 are fully crosslinked polymers. The toughness and the upper service temperature of crosslinked ESI using the disulfonyl azide are much better than that of the uncrosslinked ESI.

Preparation of Peroxide Crosslinked ESI for Comparison with Azide Crosslinked ESI Samples 7 & 8

A Haake Rheocord 9000 equipped with a 50 g mixing bowl was heated to 120° C. 48.5 g of ESI 6 (57.7% copolymer styrene,3.3% homopolymer Polystyrene, 1.02 Mi, 7.8 $I_{10}/I_2$) was added and mixed at 50 RPM. After 6 minutes, 1.5 g (3.0 wt %) of Dicumylperoxide (Hercules Inc.) was added and the sample was compounded for 6 more minutes. The sample was removed from the Haake and compression molded at 120° C. and 20,000 lb force for 3 minutes. Then cured at 170° C for 20 minutes, 200 lb (90.78 kg) force in a compression molding press (Tetrahedron Press Model-MTP-8). This was Sample 7. In Sample 8, the procedure was repeated using 47.0 g of ESI-6 and 3.0 g of dicumylperoxide (6 wt %). Tensile properties, compression set and UST by TMA were measured.

Samples 9 & 10

A Haake Rheocord 9000 equipped with a 50 g mixing bowl was heated to 120° C. 48.5 g of ESI-15 (68.5% copolymer styrene,16.9% homopolymer Polystyrene, 1.05 Mi, 9.0 I10/I2) was added and mixed at 50 RPM. After 6 minutes, 1.5 g (3.0 wt %) of Dicumylperoxide (Hercules Inc.) was added and the sample was compounded for 6 more minutes. The sample was removed from the Haake and compression molded at 120° C. and 20,000 lb (9078.48 kg)force for 3 minutes and then cured at 170° C. for 20, 200 lb (90.78 kg) force in a compression molding press (Tetrahedron Press Model-MTP-8). This was Sample 9. In Sample 10, the procedure was repeated using 47.0 g of ESI-15 and 3.0 g of dicumylperoxide (6 wt %). Tensile properties, compression set and UST by TMA were measured.

| Sample | weight % peroxide | weight % Azide | % elongation | Break Stress (PSI) | Compression Set (70° C.) | UST (TMA-°C.) | % Gel |
| --- | --- | --- | --- | --- | --- | --- | --- |
| 3 | — | 2.0 | 650 | 2000 | 17% | >190 | 98 |
| 7 | 3 | — | 630 | 890 | 33% | 179 | 82 |
| 8 | 6 | — | 360 | 880 | 8% | >190 | 93 |
| 6 | — | 2.0 | 310 | 2300 | 17% | >190 | 98 |
| 9 | 3 | — | 320 | 1800 | 64% | 97 | 64 |
| 10 | 6 | — | 310 | 1300 | 32% | >190 | 81 |

Samples 3, and 6 show that cross-linking of ESI with difunctional sulfonylazide compounds represents an improvement over peroxide crosslinked ESI (samples 7, 8, 9 and 10).

We claim:

1. A process for preparing a thermoset elastomer comprising:

(a) reacting at least one α-olefin with at least one vinylidene aromatic compound and optionally at least one diene, in the presence of a constrained geometry catalyst, to form a pseudorandom interpolymer; and (b) curing the pseudorandom interpolymer to form a thermoset elastomer.

2. The process of claim 1, wherein the α-olefin is selected from the group consisting of ethylene, propylene, 1-butene, 1-pentene, 1-hexene, 4-methyl-1-pentene, 5-methyl-1-hexene, 4-ethyl-1-hexene, 1-octene, 3-phenylpropene, and mixtures thereof;

the vinylidene aromatic compound is selected from the groups consisting of styrene, α-methylstyrene, ortho-methylstyrene, meta-methylstyrene, para-methylstyrene, chlorostyrene, vinylbenzocyclobutane, divinylbenzene, and mixtures thereof; and the diene is selected from the group consisting of butadiene, 1,3-pentadiene, 1,4-pentadiene, isoprene, 1,4-hexadiene, 7-methyl-1,6-octadiene, dicyclopentadiene, methylenenorbornene, ethylidenenorbornene, and mixtures thereof.

3. The process of claim 1, wherein the constrained geometry catalyst comprises a metal coordination complex comprising a metal of Group III or IV or the Lanthanide series of the Periodic Table of the Elements and a delocalized π-bonded moiety substituted with a constrain-inducing moiety, said complex having a constrained geometry about the metal atom such that the angle at the metal between the centroid of the delocalized, substituted π-bonded moiety and the center of at least one remaining substituent is less than such angle in a similar complex containing a similar π-bonded moiety lacking in such constrain-inducing substituent, and provided further that for such complexes comprising more than one delocalized, substituted π-bonded moiety, only one thereof for each metal atom of the complex is a cyclic, delocalized, substituted π-bonded moiety.

4. The process of claim 1, wherein the constrained geometry catalyst is selected from the group consisting of (tert-butylamido)(tetramethyl-η5-cyclopentadienyl)-1,2-ethanediylzirconium dichloride; (tert-butylamido) (tetramethyl-η5-cyclopentadienyl)-1,2-ethanediyltitanium dichloride; (tert-butylamido)dimethyl(tetramethyl-η5-cyclopentadienyl)silanetitanium dimethyl; (tert-butylamido) dimethyl(tetramethyl-η5-indenyl)silanetitanium dimethyl; (tert-butylamido) dimethyl(tetramethyl-η5-tetrahydroindenyl)silanetitanium dimethyl; (tert-butylamido)dimethyl(tetramethyl-η5-fluroenyl) silanetitanium dimethyl; (tert-butylamido) dimethyl (tetramethyl-η5-tetrahydrofluorenyl)silanetitanium dimethyl; (tert-butylamido)dimethyl(tetramethyl-η5-octahydrofluorenyl)silanetitanium dimethyl; (tert-butylamido)dimethyl(tetramethyl-η5-cyclopentadienyl) silanetitanium dibenzyl; (tert-butylamido)dimethyl (tetramethyl-η5-cyclopentadienyl)silanezirconium dibenzyl; and mixtures thereof.

5. The process of claim 3, wherein the constrained geometry catalyst is activated by a cocatalyst selected from the group consisting of polymeric alumoxanes, oligomeric alumoxanes, polymeric carbylboranes, oligomeric carbylboranes, monomeric carbylboranes, aluminum alkyls, aluminum halides, haloaluminum alkyls, substituted ammonium salts, silver salts, ferrocenium ions, and mixtures thereof.

6. The process of claim 3, wherein the constrained geometry catalyst is activated by tris(pentafluorophenyl)borane.

7. The process claim 3, wherein the curing is effected by a curing agent selected from the group consisting of peroxides; phenols; azides; aldehyde-amine reaction products; substituted ureas; substituted guanidines; substituted xanthates; substituted dithiocarbamates; thiazoles; imidazoles; sulfenamides, thiuramidisulfides, paraquinonedioxime, dibenzoparaquinonedioxime; sulfur; silane compounds, initiator for silane compounds, and optional catalyst for silane compounds; and radiation.

8. The process of claim 3, wherein the curing is effected by a curing agent selected from the group consisting of peroxides; phenols; azides; substituted dithiocarbamates; thiazoles; imidazoles; sulfenamides, thiuramidisulfides; sulfur; silane compounds, initiator for silane compounds, and optional catalyst for silane compounds; electron beam radiation and mixtures thereof.

9. The process of claim 3, wherein the curing is effected simultaneously with the mixing of the pseudorandom interpolymer and an additive.

10. A process for preparing a thermoset elastomer comprising:
(a) polymerizing at least one α-olefin with at least one vinylidene aromatic compound and optionally at least one diene, in the presence of a constrained geometry catalyst, to form a substantially random interpolymer;
(b) curing the substantially random interpolymer to form a thermoset elastomer.

11. A process for making a thermoplastic vulcanizate comprising:
(a) polymerizing at least one α-olefin with at least one vinylidene aromatic compound and optionally at least one diene in the presence of a constrained geometry catalyst to form a pseudorandom interpolymer;
(b) intimately mixing the pseudorandom interpolymer with at least one thermoplastic polyolefin at a temperature above the melting or softening point of the thermoplastic polyolefin;
(c) providing to the intimate mixture an agent for curing the pseudorandom interpolymer;
(d) simultaneously curing the pseudorandom interpolymer and compounding the intimate mixture to form a thermoplastic vulcanizate.

12. The process of claim 11, wherein
(a) the α-olefin is selected from the group consisting of ethylene, propylene, 1-butene, 1-pentene, 1-hexene, 4-methyl-1-pentene, 5-methyl-1-hexene, 4-ethyl-1-hexene, 1-octene, 3-phenylpropene, and mixtures thereof;
(b) the vinylidene aromatic compound is selected from the group consisting of styrene, α-methylstyrene, ortho-methylstyrene, meta-methylstyrene, para-methylstyrene, chlorostyrene, vinylbenzocyclobutane, divinylbenzene, and mixtures thereof; and (c) the optional diene is selected from the group consisting of butadiene, 1,3-pentadiene, 1,4-pentadiene, isoprene, 1,4-hexadiene, 7-methyl-1,6-octadiene, dicyclopentadiene, methylenenorbornene, ethylidenenorbornene, methyltetrahydroindene, and mixtures thereof.

13. The process of claim 11, wherein the constrained geometry catalyst comprises a metal coordination complex comprising a metal of Group III or IV or the Lanthanide series of the Periodic Table of the Elements and a delocalized π-bonded moiety substituted with a constrain-inducing moiety, said complex having a constrained geometry about the metal atom such that the angle at the metal between the centroid of the delocalized, substituted π-bonded moiety and the center of at least one remaining substituent is less than such angle in a similar complex containing a similar π-bonded moiety lacking in such constrain-inducing substituent, and provided further that for such complexes comprising more than one delocalized, substituted π-bonded moiety, only one thereof for each metal atom of the complex is a cyclic, delocalized, substituted π-bonded moiety.

14. The process of claim 13, wherein the constrained geometry catalyst is activated by a cocatalyst selected from the group consisting of polymeric alumoxanes, oligomeric alumoxanes, polymeric carbylboranes, oligomeric carbylboranes, monomeric carbylboranes, aluminum alkyls, aluminum halides, haloaluminum alkyls, ammonium salts, silver salts, ferrocenium ions, and mixtures thereof.

15. The process of claim 13, wherein the thermoplastic polyolefin is selected from the group consisting of monomer units derived from ethylene, propylene, 1-butene, 1-pentene, 1-hexene, 2-methyl-1-propene, 3-methyl-1-pentene, 4-methyl-1-pentene, 5-methyl-1-hexene, and mixtures thereof.

16. The process claim 13, wherein the agent for curing is the substantially random interpolymer is selected from the group consisting of peroxides, phenols, azides, aldehyde-amine reaction products, substituted ureas, substituted guanidines, substituted xanthates, substituted dithiocarbamates, thiazoles, imidazoles, sulfenamides, thiuramidisulfides, paraquinonedioxime, dibenzoparaquinonedioxime, sulfur; silane compounds, initiator for silane compounds, and optional catalyst for silane compounds; radiation and mixtures thereof.

17. A process for making a thermoplastic vulcanizate comprising:
(a) polymerizing at least one α-olefin with at least one vinylidene aromatic compound and optionally at least one diene in the presence of a constrained geometry catalyst to form a substantially random interpolymer;
(b) intimately mixing the substantially random interpolymer with at least one thermoplastic polyolefin at a temperature above the melting or softening point of the thermoplastic polyolefin;
(c) providing to the intimate mixture an agent for curing the substantially random interpolymer;
(d) simultaneously curing the substantially random interpolymer and compounding the intimate mixture to form a thermoplastic vulcanizate.

18. The process of claim 17, wherein
(a) the α-olefin is selected from the group consisting of ethylene, propylene, 1-butene, 1-pentene, 1-hexene, 4-methyl-1-pentene, 5-methyl-1-hexene, 4-ethyl-1-hexene, 1-octene, 3-phenylpropene, and mixtures thereof;
(b) the vinylidene aromatic compound is selected from the group consisting of styrene, α-methylstyrene, ortho-methylstyrene, meta-methylstyrene, para-methylstyrene, chlorostyrene, vinylbenzocyclobutane, divinylbenzene, and mixtures thereof; and (c) the optional diene is selected from the group consisting of butadiene, 1,3-pentadiene, 1,4-pentadiene, isoprene, 1,4-hexadiene, 7-methyl-1,6-octadiene, dicyclopentadiene, methylenenorbornene, ethylidenenorbornene, methyltetrahydroindene, and mixtures thereof.

19. The process of claim 17, wherein the constrained geometry catalyst comprises a metal coordination complex comprising a metal of Group III or IV or the Lanthanide series of the Periodic Table of the Elements and a delocalized II-bonded moiety substituted with a constrain-inducing moiety, said complex having a constrained geometry about the metal atom such that the angle at the metal between the centroid of the delocalized, substituted II-bonded moiety and the center of at least one remaining substituent is less than such angle in a similar complex containing a similar II-bonded moiety lacking in such constrain-inducing substituent, and provided further that for such complexes comprising more than one delocalized, substituted π-bonded moiety, only one thereof for each metal atom of the complex is a cyclic, delocalized, substituted II-bonded moiety.

20. The process of claim 17, wherein the constrained geometry catalyst is activated by a cocatalyst selected from the group consisting of polymeric alumoxanes, oligomeric alumoxanes, polymeric carbylboranes, oligomeric carbylboranes, monomeric carbylboranes, aluminum alkyls, aluminum halides, haloaluminum alkyls, ammonium salts, silver salts, ferrocenium ions, and mixtures thereof.

21. The process of claim 17, wherein the thermoplastic polyolefin is selected from the group consisting of monomer units derived from ethylene, propylene, 1-butene, 1-pentene, 1-hexene, 2-methyl-1-propene, 3-methyl-1-pentene, 4-methyl-1-pentene, 5-methyl-1-hexene, and mixtures thereof.

22. The process claim 17, wherein the agent for curing is the substantially random interpolymer is selected from the group consisting of peroxides, phenols, azides, aldehyde-amine reaction products, substituted ureas, substituted guanidines, substituted xanthates, substituted dithiocarbamates, thiazoles, imidazoles, sulfenamides, thiuramidisulfides, paraquinonedioxime, dibenzoparaquinonedioxime, sulfur; silane compounds, initiator for silane compounds, and optional catalyst for silane compounds; and mixtures thereof.

23. A method for cross-linking a polymer composition comprising (A) from about 2 to 100 percent by weight based on the combined weight of components (A) and (B) of at least one substantially random interpolymer comprising
  (1) from about 1 to about 65 mole percent of polymer units derived from (a) at least one vinylidene aromatic monomer, or (b) at least one hindered aliphatic vinylidene monomer, or (c) a combination of at least one vinylidene aromatic monomer and at least one hindered aliphatic vinylidene monomer, and
  (2) from about 35 to about 99 mole percent of polymer units derived from at least one aliphatic α-olefin having from 2 to about 20 carbon atoms;

(B) from 0 to about 98 percent by weight based on the combined weight of components (A) and (B) of at least one of the following polymers:
  (1) a polymer containing polymer units derived from an α-olefin or aromatic substituted α-olefin having from 2 to about 20 carbon atoms;
  (2) a copolymer containing (a) from about 2 to about 98 mole percent of polymer units derived from ethylene and (b) from about 98 to about 2 mole percent of polymer units derived from at least one of α-olefins having from 3 to about 20 carbon atoms, acrylic acid, methacrylic acid, vinyl alcohol, vinyl acetate, or diene having from 4 to about 20 carbon atoms;
  (3) a styrenic block copolymer;
  (4) a substantially random interpolymer defined as in (A) wherein the interpolymers (A) and (B4) are distinct in that:
    (a) the amount of vinylidene aromatic monomer and/or hindered aliphatic or cycloaliphatic vinylidene monomer in any interpolymer of component (1) differs from that amount in any interpolymer of component (4) by at least 0.5 mole percent; and/or
    (b) there is a difference of at least 20 percent between the number average molecular weight (Mn) in any interpolymer of component (1) and any interpolymer of component (4);

which method for cross-linking comprises:

subjecting the polymer composition to a sufficient amount of electron beam radiation to at least partially cross-link the polymer composition; or contacting the polymer composition with a sufficient amount of at least one peroxide compound to at least partially cross-link the polymer composition; or contacting the polymer composition with a sufficient amount of at least one azide compound to at least partially cross-link the polymer composition; or contacting the polymer composition with a sufficient amount of at least one silane compound, initiator, and optional catalyst, to at least partially cross-link the polymer composition; or a combination of any two or more of the above cross-linking methods.

* * * * *